(12) United States Patent
Schuh et al.

(10) Patent No.: US 12,492,328 B2
(45) Date of Patent: Dec. 9, 2025

(54) METHOD FOR COVERING ELONGATED ARTICLES, IN PARTICULAR LINES

(71) Applicant: TESA SE, Norderstedt (DE)

(72) Inventors: Christian Schuh, Hamburg (DE); Olga Kirpicenok, Ellerbek (DE)

(73) Assignee: tesa SE, Norderstedt (DE)

( * ) Notice: Subject to any disclaimer, the term of this patent is extended or adjusted under 35 U.S.C. 154(b) by 963 days.

(21) Appl. No.: 17/637,379

(22) PCT Filed: Aug. 19, 2020

(86) PCT No.: PCT/EP2020/073163
§ 371 (c)(1),
(2) Date: Feb. 22, 2022

(87) PCT Pub. No.: WO2021/032768
PCT Pub. Date: Feb. 25, 2021

(65) Prior Publication Data
US 2022/0290012 A1    Sep. 15, 2022

(30) Foreign Application Priority Data
Aug. 22, 2019  (DE) .................... 10 2019 212 591.1

(51) Int. Cl.
C09J 163/00    (2006.01)
C09J 7/30      (2018.01)
C09J 115/00    (2006.01)

(52) U.S. Cl.
CPC ............. *C09J 7/30* (2018.01); *C09J 115/005* (2013.01); *C09J 163/00* (2013.01); *C09J 2203/302* (2013.01); *C09J 2301/408* (2020.08); *C09J 2400/22* (2013.01); *C09J 2463/00* (2013.01); *C09J 2475/00* (2013.01)

(58) Field of Classification Search
CPC ...... C09J 115/00; C09J 115/005; C09J 163/00
See application file for complete search history.

(56) References Cited

U.S. PATENT DOCUMENTS

| | | | |
|---|---|---|---|
| 9,613,733 B2 | 4/2017 | Siebert et al. | |
| 10,297,370 B1 | 5/2019 | Boecker et al. | |
| 2015/0013874 A1 | 1/2015 | Siebert et al. | |
| 2019/0228885 A1 | 7/2019 | Boecker et al. | |

FOREIGN PATENT DOCUMENTS

| | | |
|---|---|---|
| DE | 10 2013 213 726 A1 | 1/2015 |
| DE | 10 2017 221 072 A1 | 5/2019 |
| EP | 1848006 A2 | 10/2007 |
| EP | 2497805 A1 | 9/2012 |
| EP | 3499664 A1 | 6/2019 |
| JP | 2004-056861 A | 2/2004 |
| JP | 5227105 B2 * | 7/2013 |
| WO | 2015/004190 A1 | 1/2015 |
| WO | 2019/101913 A1 | 5/2019 |

OTHER PUBLICATIONS

English translation for DE102017221072 (Year: 2017).*
English translation for JP2004056861 (Year: 2004).*
English translation for JP5227105 (Year: 2013).*
English translation for WO2015004190 (Year: 2015).*

* cited by examiner

*Primary Examiner* — Scott W Dodds
(74) *Attorney, Agent, or Firm* — Norris McLaughlin, P.A.

(57) ABSTRACT

The invention relates to a method for covering elongated articles, in particular cable sets using a curable adhesive tape.

17 Claims, 4 Drawing Sheets

METHOD FOR COVERING ELONGATED ARTICLES, IN PARTICULAR LINES

This application is a 371 of International Patent Application No. PCT/EP2020/073163, filed Aug. 19, 2020, which claims priority of German Patent Application No. 10 2019 212 591.3, filed Aug. 22, 2019, the entire contents of which patent applications are hereby incorporated herein by reference.

The invention relates to a method of jacketing elongate items, especially cable looms.

Adhesive tapes have been used for some time in industry for production of cable looms. The adhesive tapes are used for bundling of a multitude of electrical wires before installation or in the already installed state in order, for example, to reduce the space requirement of the bundle of wires by bandaging and additionally to achieve protective functions such as protection from mechanical and/or thermal stress. Standard forms of adhesive tapes include film or textile carriers that are generally coated on one side with pressure-sensitive adhesives. Adhesive tapes for jacketing of elongate items are known, for example, from EP 1 848 006 A2, DE 10 2013 213 726 A1, and EP 2 497 805 A1.

Current cable looms jacketed with adhesive tape are generally flexible. However, this is often undesirable for manufacturing reasons. In manufacture, the cable harnesses are generally prefabricated to form a cable map and then inserted into the object to be equipped, for example automobiles. A cable loom map corresponds to the actual spatial arrangement of the individual cable harnesses in the cable loom, i.e. what cable harness is bent at what angle at what point, where the positions of branches or off-branches are, and which plugs are fitted to the ends of the cable harnesses.

In order to keep the individual strands of the cable loom in a particular shape, such that they can be guided around the engine, for example, in the engine compartment without coming into contact with the engine, injection-molded parts are typically mounted subsequently around the cable loom jacketed with adhesive tape. But these injection-molded parts have the drawback of additional material expenditure and complexity of assembly.

WO 2015/004190 A1 discloses a method of jacketing elongate items such as wires or cable looms in particular, in which the elongate item is wrapped with an adhesive tape with curable adhesive applied thereto in a helical line or in axial direction, and the adhesive applied to the adhesive tape is cured by supply of radiative energy such as heat. For thermal curing, a temperature of 175° C. is employed here.

It is therefore an object of the present invention to provide a method of jacketing elongate items using a rigid adhesive tape, which leads to a sufficiently stiffened item. It is also an object of the present invention to provide a product obtainable by the method.

For solution of the technical problem, a method of jacketing elongate items is proposed, comprising a carrier in strip form that has been provided on at least one side with a self-adhesive layer that is thermally curable.

This object is achieved by a method of jacketing elongate items, such as wires or cable looms in particular, with an adhesive tape comprising a carrier in strip form that has been provided with a pressure-sensitive adhesive on at least one side, wherein the adhesive comprises a polymeric film former matrix and a curable composition, wherein the curable composition comprises one or more epoxy resins and at least one curing reagent for epoxy resins, wherein the curing reagent comprises at least one imidazole compound of the general formula

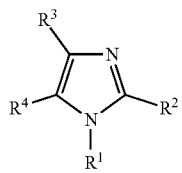

wherein $R^1$, $R^2$, $R^3$ and $R^4$ are independently hydrogen or functional groups or organic radicals, with the proviso that at least one of the $R^1$, $R^2$, $R^3$ radicals and $R^4$ is a functional group or an organic $R^{Het}$ radical having at least one heteroatom, wherein the adhesive tape is run in a helical line around the elongate item or the elongate item is wrapped by the adhesive tape in axial direction, the elongate item together with the wrapping adhesive tape is put in the desired arrangement, especially in the cable loom map, the elongate item is held in this arrangement, the curable adhesive is made to cure by the supply of thermal energy, especially at a temperature between 120° C. and 200° C. for 10 to 120 minutes.

BRIEF DESCRIPTION OF THE DRAWINGS

The invention will now be described in greater detail with respect to the drawings, wherein.

Figure 1:
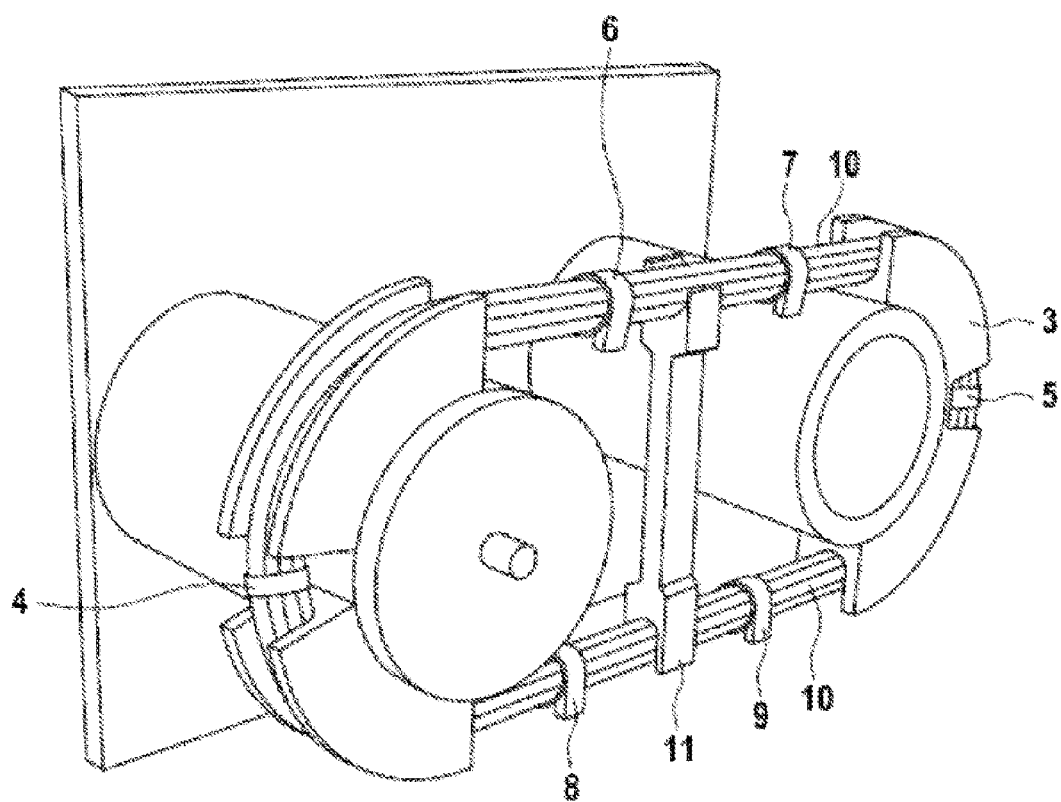
FIG. 1 is a schematic illustrating an apparatus for conducting a C-shape test for assessing cable stiffness at different temperatures.

The invention thus relates to the use of imidazole compounds in the production of curable adhesive tapes, wherein the imidazole compounds serve as curing agents for epoxy resins or as accelerators for the curing of epoxy resins. In the context of this document, imidazole compounds refer generally to all compounds comprising at least one chemical structural unit

irrespective of the particular substituents on the nitrogen atoms and carbon atoms.

The invention accordingly describes an adhesive tape comprising at least one layer of a pressure-sensitive adhesive, wherein the adhesive comprises a polymeric film former matrix and a curable composition. The curable composition in turn comprises at least one epoxy resin and at least one curing reagent for the epoxy resin. According to the invention, the curing reagent comprises at least one imidazole compound, namely one of the general formula

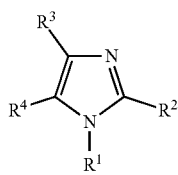

wherein $R^1$, $R^2$, $R^3$ and $R^4$ are independently hydrogen or functional groups or organic radicals, with the proviso that at least one of the $R^1$, $R^2$, $R^3$ and $R^4$ radicals is a functional group or an organic radical having at least one heteroatom (the functional group comprising the heteroatom and the organic radical comprising the heteroatom are both referred to hereinafter as $R^{Het}$ radical). This specific imidazole compound used in accordance with the invention is also referred to hereinafter as "imidazole compound of the invention".

Surprisingly, the imidazole compounds of the invention withstand the severe conditions in the production of adhesive tapes without losing their good properties with regard to good storage stability.

The teaching of the present invention therefore offers the particular option of obtaining reactive adhesives in the form of thick adhesive tape layers having high storage stability.

The $R^1$, $R^2$, $R^3$ and/or $R^4$ radicals that are not $R^{Het}$ radicals, i.e. those that are not radicals containing further heteroatoms, may very advantageously each independently be selected as hydrogen or as an aliphatic or aromatic hydrocarbon radical which has 1 to 15 carbon atoms and does not have any heteroatoms.

It is advantageously possible to use, for example, 5 to 80 parts by weight of at least the polymeric film former matrix (M) and 20 to 95 parts by weight of one epoxy resin or the sum total of epoxy resins when the parts by weight of the film former matrix and the epoxy resins add up to 100. The amount of curing reagent to be used with preference may vary depending on the curing agents and any accelerators used; see further down.

The curable composition is especially cured by the reaction of one or more reactive resins with one or more curing agents and optionally accelerators (the components of the curing reagent). The curable composition comprises at least one epoxy resin as reactive resin, but may also comprise two or more epoxy resins. The one epoxy resin or the two or more epoxy resins may be the sole reactive resins in the curable composition, i.e. especially the sole components in the curable composition that can lead to curing of the composition with curing agents—optionally after appropriate activation. In principle, however, it is also possible that not only the epoxy resin or not only the epoxy resins but also further reactive resins that are not epoxy resins are present.

Epoxy resin(s) used are, for example and advantageously, one or more elastomer-modified, especially nitrile rubber-modified, epoxy resins and/or one or more silane-modified epoxy resins and/or one or more fatty acid-modified epoxy resins. Reactive resins are crosslinkable resins, namely oligomeric or short-chain polymeric compounds comprising functional groups, especially having a number-average molar mass $M_n$ of not more than 10 000 g/mol, and especially those having multiple functional groups in the macromolecule. Since the resins are a distribution of macromolecules of different individual masses, the reactive resins may contain fractions wherein the number-average molar mass is much higher, for example up to about 100 000 g/mol; this is especially true of polymer-modified reactive resins, for example elastomer-modified reactive resins.

Reactive resins differ from tackifying resins frequently used for adhesives, especially for pressure-sensitive adhesives. A "tackifying resin", according to the general understanding of those skilled in the art, is understood to mean an oligomeric or polymeric resin that merely increases adhesion (tack, intrinsic tackiness) of the pressure-sensitive adhesive compared to the pressure-sensitive adhesive that does not contain any tackifying resin but is otherwise identical. Typically, tackifying resins, apart from double bonds (in the case of the unsaturated resins), do not contain any reactive groups since their properties are not supposed to change over the lifetime of the pressure-sensitive adhesive.

The functional groups of the reactive resins are such that they lead to curing of the composition comprising the reactive resins and a curing reagent under suitable conditions—especially after activation, for example by elevated temperature (thermal energy) and/or by actinic radiation (such as light, UV radiation, electron beams etc.) and/or by initiation and/or catalysis by further chemical compounds, for instance water (moisture-curing systems)—especially by a crosslinking reaction. Curing reagents may be formed, for example, from one curing agent or from a mixture of two or more curing agents or from a mixture of one or more curing agents with accelerators.

Epoxy resins in the context of this document refer to reactive resins comprising epoxy groups, i.e. those having more than one epoxy group per molecule, i.e. those reactive resins in which the functional groups or at least some of the functional groups are epoxy groups. The conversion of the epoxy resins during the curing reaction of the curable composition is especially effected via polyaddition reactions with suitable epoxy curing agents or by polymerization via the epoxy groups. According to the choice of epoxy curing agent, it is also possible for both reaction mechanisms to take place in parallel.

A curing agent in the context of this document refers, in accordance with DIN 55945:1999-07, to the chemical compound(s) that act(s) as binder and is/are added to the curable resins in order to bring about the curing (crosslinking) of the curable composition, especially in the form of an applied film. In the curable compositions, "curing agent" is accordingly the name for that component which brings about the chemical crosslinking after mixing with the reactive resins and appropriate activation.

"Accelerator" in the context of this document refers to those chemical compounds which, in the presence of another curing agent, increase the reaction rate of the curing reaction and/or the rate of activation of the curing of the epoxy resins, especially in a synergistic manner.

There is overlap here between the lists for selection of the substances usable as curing agent or as accelerator, it being possible for the individual representatives also to simultaneously implement both modes of function, and so there is generally a fluid transition between curing agent and accelerator. In addition, chemical compounds that are utilized as curing agent alone frequently act as accelerator when used with a further curing agent. Curing reactions are fundamentally identifiable as a peak in dynamic differential calorimetry (DSC). An accelerator is especially understood to mean those compounds whose addition results in a shift in the curing peak of a particular curing agent toward lower temperatures. Additional curing agents, by contrast, are especially those compounds that lead to a second peak—generally present in isolation, but possibly also overlapping the first peak—for a curing reaction in the DSC.

The term "curing reagent"—by contrast with the individual curing agents and accelerators—refers to the entirety of the curing agents used and any accelerators for the curing reaction by means of the corresponding reactive component (the corresponding reactive resin(s)). The curing reagent may accordingly especially be formed from one or more curing agent(s) or from one or more curing agent(s) in the presence of one or more accelerator(s).

(Co-)curing agents in the context of this document refer to the individual components of the curing reagent, which thus form this curing reagent overall. The term "(co-)curing agent" thus represents a curing agent or accelerator respectively present.

The imidazole compound of the invention when used alone—i.e. as the sole component of the curing reagent—serves here as curing agent for the curing reaction of the curable composition. If it is used together with further chemical compounds that serve as curing agent and/or accelerator, it may itself serve as curing agent or as accelerator for the curing reaction of the curable composition.

In the further description of components, compounds, compositions or the like that may be used individually or multiply within the scope of the teaching of the present document (introduced, for example, by "at least one epoxy resin" or "one or more epoxy resins"), the use of the plural hereinafter shall encompass the singular (the statement "advantageous epoxy resins are selected from the list of compounds X, Y, Z" thus also includes the disclosure that, in the case of presence of just one epoxy resin, this may advantageously be selected from the list mentioned). Conversely, the use of the singular shall not restrict the specification to the case where the component is used only individually (the statement "examples of the epoxy resin advantageously include the compounds X, Y and Z" thus also includes the disclosure that, in the case that multiple epoxy resins are present, all may advantageously be chosen—each independently—from this list).

If the singular or plural is specifically important in the particular case, this is stated at the corresponding point.

The curable composition of the adhesive tape according to the invention is preferably an adhesive, especially a reactive adhesive, more preferably an adhesive or reactive adhesive which is pressure-sensitive at room temperature (23° C.)

Adhesives (according to DIN EN 923:2008-06) are nonmetallic substances that join joining partners via two-dimensional adhesion and inner strength (cohesion). Adhesives may be self-adhesive and/or develop their ultimate bonding force only via particular activation, for instance via thermal energy and/or actinic radiation. Reactive adhesives (that may be self-adhesive or nonadhesive prior to activation) comprise chemically reactive systems which can lead to a curing reaction via activation and can develop particularly high bonding forces (especially greater than 1 MPa) to the substrates to which they are bonded.

The curing or consolidation is achieved through chemical reaction of the reactants with one another. By contrast with pressure-sensitive adhesives that are regularly also crosslinked to increase cohesion, but still have viscoelastic properties even after crosslinking and especially do not undergo any further consolidation after bonding, it is generally only the curing in the case of reactive adhesives that leads to the actual bonding with the desired bonding forces; the adhesive itself is frequently thermoset or largely thermoset after the curing ("paintlike").

The attribute "pressure-sensitively adhesive"—including as a constituent of nouns, as in pressure-sensitive adhesive composition for instance—or synonymously with the attribute "self-adhesive"—likewise also as part of nouns—is understood in the context of this document to refer to those compositions that even under relatively gentle pressure—unless stated otherwise, at room temperature, i.e. 23° C.—permit a lasting bond to the substrate and, after use, can be redetached from the substrate essentially without residue. Pressure-sensitive adhesives are preferably used in the form of adhesive tapes. In the context of the present invention, a pressure-sensitive adhesive tape has a bonding force in the uncured state of at least 1 N/cm. Bonding force is determined here on steel analogously to ISO 29862:2007 (method 3) at 23° C. and 50% relative air humidity at a peel rate of 300 mm/min and a peel angle of 180°. The reinforcing film used is an etched PET film having a thickness of 36 μm, as obtainable from Coveme (Italy). The bonding of a 2 cm-wide test strip is undertaken here by means of a 4 kg roll applicator at a temperature of 23° C. The adhesive tape is peeled off immediately after application. The measured value (in N/cm) was obtained as the average value from three individual measurements.

Pressure-sensitive adhesives are permanently pressure-sensitive at room temperature, and thus have sufficiently low viscosity and high tackiness to the touch, such that they wet the surface of the particular adhesive substrate even at low contact pressure. The bondability of the pressure-sensitive adhesives is based on their adhesive properties, and the redetachability is based on their cohesive properties.

Pressure-reactive adhesives have pressure-sensitive properties at room temperature (and are especially viscoelastic in this state), but have the characteristics of reactive adhesives during and after curing.

According to the invention, the curable composition, especially the pressure-sensitive adhesive, is used in the form of a film or layer as a constituent of an adhesive tape.

For this purpose, the curable composition, especially the pressure-sensitive adhesive, is applied as a layer to a permanent or temporary carrier, especially by the coating methods known to the person skilled in the art. The material in sheet form is preferably coated in a solvent-free manner, for example by means of nozzle coating or with a multiroll applicator system. This can be effected particularly effectively and advantageously with a 2- to 5-roll applicator system, for example with a 4-roll applicator system, such that the self-adhesive composition is shaped to the desired thickness before transfer to the material in sheet form as it passes through one or more roll nips. The roll temperatures of the applicator system may be adjusted individually, for example to temperatures of 20° C. to 150° C.

Film Former Matrix

The adhesive tape according to the invention comprises a polymeric film former matrix including the curable composition comprising at least one epoxy resin and at least one curing reagent for the epoxy resin. Such adhesive tapes thus comprise an adhesive film fundamentally formed from a polymeric film-forming matrix (referred to as "film former matrix" for short in the context of this document) with the curable composition embedded therein that especially serves as reactive adhesive. The film former matrix here especially forms a self-supporting three-dimensional film (with the spatial extent in thickness direction of the film generally being very much smaller than the spatial extents in longitudinal and transverse direction, i.e. than in the two spatial directions of the two-dimensional extent of the film; with regard to the meaning of the term "film" see also further down). The curable composition, especially the reactive adhesive, is preferably distributed in this film former matrix essentially in a spatially equally distributed (homogeneous)

manner, especially such that the reactive adhesive—that possibly would not be self-supporting without the matrix assumes essentially the same (macroscopic) spatial distribution in the adhesive film according to the invention as the film former matrix.

The function of this matrix is to form an inert skeleton for the reactive monomers and/or reactive resins, such that they are intercalated in a film or foil. It is thus also possible for otherwise liquid systems to be supplied in film form. In this way, easier handling is ensured. The parent polymers of the film former matrix, by virtue of sufficient interactions of the macromolecules, are capable of forming a self-supporting film, for example—without wishing to unnecessarily restrict the concept of the invention thereby—by formation of a network on account of physical and/or chemical crosslinking.

What is meant by "inert" in this context is that the reactive monomers and/or reactive resins, under suitably chosen conditions (for example at sufficiently low temperatures), essentially do not react with the polymeric film former matrix.

Suitable film former matrices for use in the present invention preferably include a thermoplastic homopolymer or a thermoplastic copolymer (referred to collectively in the context of this document as "polymers"), or a blend of thermoplastic homopolymers or thermoplastic copolymers or of one or more thermoplastic homopolymers with one or more thermoplastic copolymers. In a preferred procedure, wholly or partly semicrystalline thermoplastic polymers are used.

Thermoplastic polymers chosen may in principle, for example, be polyesters, copolyesters, polyamides, copolyamides, polyacrylic esters, acrylic ester copolymers, polymethacrylic esters, methacrylic ester copolymers, thermoplastic polyurethanes, and chemically or physically crosslinked substances of the aforementioned compounds. The polymers mentioned may each be used as a polymer used on its own or as a component of a blend.

In addition, elastomers and—as representatives of the thermoplastic polymers already mentioned—thermoplastic elastomers are also conceivable as polymeric film former matrix, on their own or in a mixture. Preference is given to thermoplastic elastomers, especially semicrystalline thermoplastic elastomers. The elastomers mentioned—especially thermoplastic elastomers—may each be used as a polymer used on its own or as a component of a blend, for example with furthrt elastomers and/or thermoplastic elastomers and/or other thermoplastic polymers, for example those representatives mentioned in the paragraph above.

Particular preference is given to thermoplastic polymers having softening temperatures less than 100° C. In this connection, the term "softening temperature" represents the temperature from which the thermoplastic pellets stick to each other. If the constituent of the polymeric film former matrix is a semicrystalline thermoplastic polymer, it very preferably has, as well as its softening temperature (which is connected to the melting of the crystallites), a glass transition temperature of not more than 25° C., preferably not more than 0° C.

In a preferred embodiment of the invention, a thermoplastic polyurethane is used. The thermoplastic polyurethane preferably has a softening temperature of less than 100° C., especially less than 80° C.

In a particularly preferred embodiment of the invention, Desmomelt 530® is used as polymeric film former matrix, commercially available from Bayer Material Science AG, 51358 Leverkusen, Germany. Desmomelt 530® is a hydroxy-terminated, largely linear, thermoplastic, highly crystallizing polyurethane elastomer.

It is advantageously possible, for example, to use 5 to 80 parts by weight of the at least one polymeric film former matrix within a reactive adhesive film. The amount of the polymeric film former matrix within a reactive adhesive film is preferably, according to the invention, in the range from about 15% to 60% by weight, preferably about 30% to 50% by weight, based on the total amount of polymers in the polymeric film former matrix and reactive resins in the curable composition. Adhesives having particularly high bond strength after curing are obtained when the proportion of the film former matrix is in the range from 15% to 25% by weight. Such adhesives, especially with less than 20% film former matrix, are very soft and not very dimensionally stable in the uncured state. Shape stability is improved when more than 20% by weight, especially more than 30% by weight, is used. Between 40% and 50% by weight, pressure-sensitive adhesives that display the best properties in relation to shape stability are obtained, but there is a drop in the maximum bond strength achievable. Very balanced adhesives in relation to shape stability and bond strength are obtained in the range from 30% to 40% by weight of film former matrix. The above percentages by weight here are based in each case on the sum total of polymers and epoxy resins that form the film former matrix.

In a further, very preferred procedure, the matrix polymers used are non-thermoplastic elastomers. The non-thermoplastic elastomers may especially be a nitrile rubber or a mixture of two or more nitrile rubbers or a mixture of one or more other non-thermoplastic elastomers with one or more nitrile rubbers.

"Non-thermoplastic" substances or compositions in the context of the present document refer to those that do not show thermoplastic behavior on heating to a temperature of 150° C., preferably on heating to a temperature of 200° C., very preferably on heating to a temperature of 250° C., especially such that they are not considered to be thermoplastic in the thermoplasticity test (see Experimental Section).

The term 'nitrile rubber', as usual, represents 'acrylonitrile-butadiene rubber', NBR for short, and refers to synthetic rubbers that are obtained by copolymerization of acrylonitrile and butadiene in mass ratios of about 10:90 to 52:48 (acrylonitrile:butadiene).

Nitrile rubbers are produced virtually exclusively in aqueous emulsion. In the prior art, the resulting emulsions are either used as such (NBR latex) or else worked up to give a solid rubber.

The properties of the nitrile rubber depend on the ratio of the starting monomers and on the molar mass thereof. Vulcanizates obtainable from nitrile rubber have high resistance to fuels, oils, fats and hydrocarbons, and, compared to those made from natural rubber, feature more favorable aging characteristics, lower abrasion and reduced gas permeability.

Nitrile rubbers are available in a wide variety. The various types are distinguished not only by the acrylonitrile content but especially by the viscosity of the rubber. This is typically reported by the Mooney viscosity. This in turn is determined firstly by the number of chain branches in the polymer and secondly by the molar mass. A basic distinction is made in the polymerization between what is called cold polymerization and hot polymerization. Cold polymerization is typically effected at temperatures of 5 to 15° C. and, by contrast with hot polymerization, which is typically conducted at 30 to 40° C., leads to a smaller number of chain branches.

Nitrile rubbers suitable in accordance with the invention are available from a multitude of manufacturers, for example Nitriflex, Zeon, LG Chemicals and Lanxess.

Carboxylated nitrile rubber types form through terpolymerization of acrylonitrile and butadiene with small proportions of acrylic acid and/or methacrylic acid in emulsion. They are notable for high strength. The selective hydrogenation of the C=C double bond of nitrile rubber leads to hydrogenated nitrile rubbers (H—NBR) with increased stability to increasing temperature (up to 150° C. in hot air or ozone) or resistance to swelling agents (for example sulfur-containing crude oils, brake fluids or hydraulic fluids). Vulcanization is effected with customary sulfur crosslinkers or peroxides or by means of high-energy radiation. As well as carboxylated or hydrogenated nitrile rubbers, there are also liquid nitrile rubbers. The molar mass of these is limited during the polymerization by the addition of polymerization regulators, and they are therefore referred to as liquid rubbers.

For the purpose of improved processibility of rubbers, for example the pelletizing of pellets from large rubber bales prior to further processing in mixers, inert separating aids such as talc, silicates (talc, clay, mica), zinc stearate and PVC powders are frequently added to the rubbers.

In one execution variant of the invention, non-thermoplastic elastomers used are partly or exclusively those nitrile rubbers having an acrylonitrile content of at least 25%, preferably of at least 30%, very preferably of at least 35%.

Hot-polymerized nitrile rubbers have excellent usability as matrix polymers. Such nitrile rubbers are highly branched, and therefore have a particularly high tendency to incipient physical crosslinking, and hence show particularly good shear strengths even in the uncured state.

Curing Reagent

As already set out above, the curing reagent comprises the sum total of the (co-)curing agents, i.e. the entirety of the curing agents present and any accelerators present, where at least one imidazole compound of the invention is present. The at least one imidazole compound of the invention of the curing reagent may serve as curing agent and/or as accelerator for the curing reaction. The statements made in the context of this document with regard to the imidazole compound of the invention are applicable regardless of whether it is used as curing agent or as accelerator, unless explicit reference is made to one of the end uses in the individual case.

Imidazole compounds of the invention typically do not have to be used in stoichiometric amounts, based on the functionality of the epoxy resin to be cured, in order to display good action as curing agent or as accelerator.

If an imidazole compound of the invention is used as the sole curing agent, typical amounts used are 15 to 35 parts by weight per 100 parts by weight of the epoxy resin(s) to be cured. If multiple imidazole compounds of the invention are used, the sum total of the amounts used is advantageously within the aforementioned range.

In an alternative procedure, the amount of the imidazole compound of the invention used—or the total amount when multiple imidazole compounds of the invention are used—is preferably in the range from 0.1 to 10 parts by weight, especially from 0.5 to 5 parts by weight, preferably from 1 to 3 parts by weight, based in each case on 100 parts by weight of the epoxy resin(s) to be cured—especially when the imidazole compound(s) according to the invention is/are used as accelerator—for example in combination with imidazole compounds which are not imidazole compounds of the invention. In all cases—in particular when the imidazole compound of the invention is a relatively weak accelerator—it is advantageous to use amounts in the range of 4-8 parts by weight.

In order to obtain particularly storable reactive adhesives (storability being determinable, for instance, by the storage time) even at elevated temperatures—for example at 60° C., it has been found that, surprisingly, contrary to expectation, it is insufficient to select curing agents or accelerators solely ensuring that the softening point thereof is above the storage temperature. For instance, systems having a softening point above the storage temperature are frequently processible, but nevertheless have poor storabilities within the temperature range in question. For example, systems having a softening point according to MSDS of softening point 70° C. (Intelimer 7004) or even of 89° C. (Epikure P-101) have relatively poor storabilities at 60° C.: $L_f60<30\%$.

For that reason, in a particularly preferred embodiment, preference is given to those imidazole compounds of the invention having a softening point of not less than 100° C. (softening point determined with a melting point analyzer).

In a particularly preferred form, the imidazole compound of the invention, or all imidazole compounds of the invention in the presence of multiple imidazole compounds of the invention, are used in particulate form. This can be achieved, for example, in that the imidazole compound of the invention is in dispersed form in the curable composition, and more particularly is not soluble in any other component of the adhesive tape, especially not even partly soluble.

The use of the (co-)curing agent in undissolved or particulate form leads to an at least biphasic system and hence to an elevated storage stability of the curable composition. Advantageously, the dispersion should persist even at well above room temperature, for example up to at least 90° C. for instance, preferably up to 100° C. Only on attainment of the later curing temperature is activation of the curing reagent required; in that the particulate curing agents go partly or completely into the dissolved state.

It has been found that, surprisingly, imidazole compounds of the invention can also be processed thermally, for example at 90° C., when the viscosity of the adhesive is high even at this high temperature. One assumption—without wishing to commit to this theory—is that the unwanted premature dissolution of such compounds in reactive resins is slowed or suppressed on account of the high viscosity. Advantageous viscosities of the hot adhesive have been found to be greater than 10 Pa s at 90° C., especially greater than 100 Pa s. Even adhesives having viscosities exceeding 1000 Pa s at 90° C. were processible both in an extruder and in a laboratory kneader and showed very preferred storabilities, which is attributed to the surprising interaction between melt viscosity and the modified imidazole accelerators. The person skilled in the art would certainly prefer lower viscosities since the imidazole particles could be brought into solution by distinctly lower shear forces in such a system. (Co-)curing agents corresponding to the imidazole compound of the invention have at least one substituent $R^{Het}$ which comprises at least one heteroatom in its chemical structure. The imidazole compounds of the invention may also comprise more than one heteroatom, where these may be identical or different.

The imidazole compound of the invention may favorably be used in a form without further conversion. In a further favorable manner, the imidazole compounds of the invention may also be used in the form of imidazole-acid adducts in order to further optimize storability.

Imidazole-acid adducts refer to those conglomerates connected by bonds or interactions that form through suitable reactions of the imidazole compounds in question with carboxylic acids. The term is not limited to covalently formed adducts. Imidazole-acid adducts may also, for example, be in ionic form or salt form, or the adduct may result from different interactions between imidazole and acid. Adduct formation stabilizes the imidazole compound especially by lowering its reactivity (for instance by blocking); to bring about the curing effect, the lowered reactivity is then increased again; in particular returned back to the starting state.

Carboxylic acids can advantageously be used as acids. Suitable examples of carboxylic acids for preparation of the imidazole-acid adducts include trimellitic acid and isocyanuric acid. The adducts may advantageously also be used in hydrated form, for instance as imidazole-acid adduct hydrate or as imidazole-acid adduct dihydrate for example.

As already set out above, accelerators are those chemical compounds which, when used in addition to one or more curing agents, increase the reaction rate of the curing reaction and/or the rate of activation of the curing reaction—compared to the progression in the absence of the accelerator(s). This can be determined by means of DSC. For instance, the reaction peak is shifted to lower temperatures by addition of suitable accelerators.

According to the invention, the adhesive of the adhesive tape according to the invention may contain one or more accelerators. The effect of an accelerator is in particular, for instance, that the starting temperature for the crosslinking reaction of the reactive resin and/or the reaction temperature at which the curing reaction proceeds is reduced. This improves handling in the bonding operation. It should be noted here that the starting temperature lowered by the addition of an accelerator is associated with a reduced storage stability as a disadvantage, since the lowering of the starting temperature also results in unwanted elevated reaction during storage. Nevertheless, the adhesive tapes according to the invention are far superior in terms of storage stability to the prior art prepregs impregnated with epoxy adhesives.

However, if the effect mentioned is to be completely avoided, it is also possible to dispense entirely with accelerators.

Accelerators used may in principle, and particularly advantageously in accordance with the invention, be the compounds as described above as curing agents; the observations made there are correspondingly applicable. In the choice of accelerator, the reactivity thereof is especially advantageously matched with that of the curing agent(s) used, in order to achieve the accelerator effect. For instance, the curing agent(s) may be selected such that the curing reaction proceeds very effectively and/or completely, while the accelerator(s) is/are chosen such that the reaction rate and/or the rate of activation is increased; in particular, the reaction temperature of curing and/or the starting temperature of the curing reaction is lowered.

In a further execution variant of the invention, the curing reagent—in addition to the imidazole compound(s) according to the invention—comprises one or more curing agents for the epoxy resins and/or one or more accelerators for the curing reaction of the epoxy resins, where these curing agents or accelerators are not imidazole compounds of the invention.

Such additional curing agents or accelerators selected may especially advantageously be compounds from the following list: dicyandiamide, anhydrides, epoxy-amine adducts, hydrazides and reaction products of diacids and polyfunctional amines. Examples of useful reaction products of diacids and polyfunctional amines include reaction products of phthalic acid and diethylenetriamine.

In a very preferred execution of the invention, the curing reagent comprises dicyandiamide and one or more imidazole compounds of the invention. Even further preferably, the curing reagent consists exclusively of dicyandiamide and one or more imidazole compounds of the invention. In combination with dicyandiamide, the one imidazole compound of the invention, or at least one of the imidazole compounds of the invention when two or more imidazole compounds of the invention are present, typically acts as accelerator, and thus increases the reaction rate of the curing reaction of the epoxy resin compared to the situation in which dicyandiamide is present as the sole component of the curing reagent.

The invention thus further provides an adhesive tape comprising at least one layer of a pressure-sensitive adhesive, where the adhesive comprises a polymeric film former matrix and a curable composition, wherein the curable composition comprises at least one epoxy resin and at least one curing reagent for the epoxy resin, and wherein the curing reagent comprises i) at least one imidazole compound of the invention and ii) dicyandiamide, or consists thereof.

Stoichiometric curing agents, for example dicyandiamide, are preferably used on the basis of the amount of epoxide in the adhesive. For this purpose, first of all, the EEW of the epoxy mixture is calculated by the following formula:

$$EEW_{tot} = m_{tot} \Big/ \sum \frac{m_i}{EEW_i}$$

where
$m_{tot}$=total $m_i$
$m_i$=masses of the individual components i of the mixture
$EEW_i$=epoxy equivalents of components i The amount of curing agent $m_H$ is then found from the amine equivalent of the curing agent (AEW) and the $EEW_{tot}$ of the epoxy mixture as follows:

$$m_H = AEW*(m_i/EEW_{tot})$$

The imidazole compound(s) according to the invention that act(s) as accelerator is/are then advantageously used at 0.1 to 10 parts by weight, especially at 0.5 to 5 parts by weight, preferably at 1 to 3 parts by weight, based in each case on 100 parts by weight of the epoxy resin to be cured. In all cases—in particular when the imidazole compound of the invention is a relatively weak accelerator—amounts in the range of 4-8 parts by weight are used.

If, in addition to the epoxy resins, other reactive resins are present in the curable composition, it is additionally also possible to add specific curing agents and/or accelerators for reaction with these components.

Epoxy Resins

Epoxy resin(s) used in the curable composition may be a single epoxy resin or a mixture of epoxy resins. In principle, it is possible to use epoxy resins that are liquid at room temperature or epoxy resins that are solid at room temperature or mixtures thereof.

The one epoxy resin or at least one of the epoxy resins is preferably a solid; especially one having a softening temperature of at least 45° C. or one having a viscosity at 25° C. of at least 20 Pa s, preferably 50 Pa s, especially at least 150 Pa s (measured to DIN 53019-1; 25° C., shear rate $1 \times s^{-1}$).

In a favorable execution of the adhesive tape according to the invention, the epoxy resins comprise a mixture of epoxy resins that are liquid at 25° C. and solid at 25° C. The proportion of liquid epoxy resins in the epoxy resins (E) is especially 10% to 90% by weight, further preferably 20% to 75% by weight. The respective difference from 100% by weight of the epoxy resins is then made up by solid epoxy resins. Adhesive tapes with such ratios of liquid and solid epoxy components show particularly balanced adhesive properties in the uncured state. If an adhesive tape having particularly good adaptation properties is desired, the proportion of liquid epoxy components is preferably 50% to 80% by weight. For applications in which the adhesive tapes even in the uncured state have to bear a relatively high load, a proportion of 15% to 45% by weight is particularly preferred. It is possible to use one such resin or else a mixture of different resins.

Further preferably, the epoxy resins (E) comprise at least two different epoxy resins (E-1) and (E-2), of which
 a. the first epoxy resin (E-1) at 25° C. has a dynamic viscosity of less than 500 Pa*s, measured to DIN 53019-1 at a measurement temperature of 25° C. and a shear rate of $1 \times s^{-1}$, and
  b. of which the second epoxy resin (E-2) has a softening temperature of at least 45° C. or at 25° C. has a dynamic viscosity of at least 1000 Pa*s, measured to DIN 53019-1 at a measurement temperature of 25° C. and a shear rate of $1 \times s^{-1}$,
 where, in particular, the proportion of the first epoxy resin (E-1) is 10% to 90% by weight, preferably 20% to 75% by weight, and the proportion of the second epoxy resin (E-2) is 10% to 90% by weight, preferably 25% to 80% by weight, based on the totality of epoxy resins. Advantageously, the epoxy resin component consists of these two epoxy resins (E-1) and (E-2), such that the proportion of two epoxy resins (E-1) and (E-2) in the total epoxy resin adds up to 100% by weight.

Particularly good adhesives are obtained when the proportion of epoxy resin (E2) is in the range from 40% to 80% by weight, especially 60% to 75% by weight. In a specific embodiment, the proportion of epoxy resins (E-2) having a softening temperature of at least 45° C. is at least 35% by weight, especially in the range from 40% to 70% by weight.

The cohesion of the uncrosslinked pressure-sensitive adhesives, given adequate tack, is particularly good when the proportion of epoxy resins having a softening temperature of at least 45° C. is at least 15% by weight, especially in the range from 20% by weight to 75% by weight, based on the overall epoxy resin. Adaptation characteristics are improved when less than 55% by weight, especially between 25% by weight and 45% by weight, is present.

Epoxy resins to be used advantageously as epoxy resin or as part of the entirety of the epoxy resins are, for example, elastomer-modified epoxy resins, silane-modified epoxy resins or fatty acid-modified epoxy resins.

Elastomer-modified epoxy resins in the context of the present invention should be understood to mean epoxy resins that are especially liquid and generally of high viscosity and have an average functionality of at least two and an elastomer content of up to 50% by weight, preferably one of 5-40% by weight. The epoxy groups may be in a terminal arrangement and/or in the side chain of the molecule. The elastomeric structure component of these flexibilized epoxy resins consists of polyenes, diene copolymers and polyurethanes, preferably of polybutadiene, butadiene-styrene or butadiene-acrylonitrile copolymers.

An example of an epoxy resin modified by butadiene-acrylonitrile copolymers (nitrile rubber) is an epoxy prepolymer which is obtained by modification of an epoxy resin having at least two epoxy groups in the molecules with a nitrile rubber. The epoxy base used is advantageously a reaction product of glycerol or propylene glycol and a halogen-containing epoxy compound, such as epichlorohydrin, or the reaction product of a polyhydric phenol, such as hydroquinone, bisphenol A, and a halogen-containing epoxide. What is desirable is a reaction product formed from an epoxy resin of the bisphenol A type having two terminal epoxy groups.

For binding of the epoxy resins, in the case of butadiene polymers or butadiene-acrylonitrile copolymers (so-called nitrile rubbers), it is possible to include a third monomer with acid function—for example acrylic acid—in the polymerization. The acid and the nitrile rubbers give what are called carboxy-terminated nitrile rubbers (CTBN). In general, these compounds contain acid groups not just at the ends but also along the main chain. CTBNs are supplied, for example, under the Hycar trade name by B. F. Goodrich. These have molar masses between 2000 and 5000 and acrylonitrile contents between 10% and 30%. Specific examples are Hycar CTBN 1300×8, 1300×13 or 1300×15. The reaction proceeds correspondingly with butadiene polymers.

Reaction of epoxy resins with CTBNs affords what are called epoxy-terminated nitrile rubbers (ETBNs), which are used with particular preference for this invention. Such ETBNs are commercially available, for example, from Emerald Materials under the HYPRO ETBN name (formerly Hycar ETBN)—for example Hypro 1300X40 ETBN, Hypro 1300X63 ETBN and Hypro 1300X68 ETBN. One example of an epoxy-terminated butadiene rubber is Hypro 2000X174 ETB.

Further examples of elastomer-modified epoxy-functional compounds are a reaction product of a diglycidyl ether of neopentyl alcohol and a butadiene/acrylonitrile elastomer having carboxyl ends (for example EPONTM Resin 58034 from Resolution Performance Products LLC), a reaction product of a diglycidyl ether of bisphenol A and a butadiene/acrylonitrile elastomer having carboxyl ends (for example EPONTM Resin 58006 from Resolution Performance Products LLC), a butadiene/acrylonitrile elastomer having carboxyl ends (for example CTBN-1300X8 and CTBN-1300X13 from Noveon, Inc., Cleveland, Ohio), and a butadiene/acrylonitrile elastomer having amine ends (for example ATBN-1300X16 and ATBN-1300X42 from Noveon, Inc.). One example of the elastomer-modified epoxy resin adduct is the reaction product of an epoxy resin based on bisphenol F and a butadiene/acrylonitrile elastomer having carboxyl ends (for example EPONTM Resin 58003 from Resolution Performance Products LLC).

The proportion of the elastomer-modified epoxy resins based on the total amount of epoxy resins in the curable composition may be between 0% and 100%. For bonds having particularly high bond strength and low elongation, comparatively lower proportions—for example 0% to 15% by weight—are chosen. By contrast, adhesives with high elongation values are obtained when the proportion is greater than 40% by weight, especially greater than 60% by weight. For many applications, a balanced ratio between bond strength and elongation is desired. Preference is given here to proportions between 20 to 60% by weight, especially 30 to 50% by weight. According to the profile of requirements, it may also be advantageous to create adhesives with a proportion of up to 100%.

Further suitable representatives used for the epoxy resins may very advantageously be silane-modified epoxy resins. It is possible here for a single silane-modified epoxy resin or for two, three or even more silane-modified epoxy resins to be present in the curable composition. The curable composition may be limited to the silane-modified epoxy resin(s) as curable reactive resins. As well as the epoxy resin(s), it is also possible for further, non-silane-modified epoxy resins to be present—for example elastomer-modified, especially nitrile rubber-modified, epoxy resins and/or fatty acid-modified epoxy resins, as individually set out in detail in this document, and/or else reactive resins that are not epoxy resins.

If a single silane-modified epoxy resin is present, this may especially be selected from the silane-modified epoxy resins described as preferred hereinafter. If multiple silane-modified epoxy resins are present, advantageously at least one of the epoxy resins is one of the compounds described hereinafter as preferred silane-modified epoxy resins. Further preferably, all silane-modified epoxy resins are those as described as preferred hereinafter.

The chemical modification of epoxy resins can be utilized for control of the properties of adhesives. Modified epoxy resins of the invention are especially selected from silane-modified epoxy resins. Silane group-modified epoxy resins are those epoxy resins to which one or more silane groups are chemically bonded.

In principle, there are different ways of binding silane groups chemically to epoxy resins.

In a preferred procedure, the epoxy resin used is a silane-modified epoxy resin obtainable by dealcoholizing condensation reaction between a bisphenol epoxy resin and a hydrolyzable alkoxysilane. Such epoxy resins are described, for example, in EP 1114834 A, the disclosure content of which is hereby incorporated into the present document by reference.

The bisphenol epoxy resin may advantageously be chosen such that it has an epoxy equivalent weight of more than 180 g/eq, and preferably of less than 5000 g/eq. For epoxy resins or epoxy crosslinkers, the epoxy equivalent weight (abbreviation: EEW) is a characteristic and important parameter. According to DIN EN ISO 3001:1999-11, the epoxy equivalent weight indicates the amount of the substance in question in the solid state in grams that is bound per epoxy group. Preference is given to using epoxy resins having an EEW>180 g/eq, since there may otherwise be insufficient hydroxy groups for the condensation reaction with the alkoxysilanes.

In a preferred manner, the bisphenol epoxy resin used for reaction with the hydrolyzable alkoxysilane is compounds conforming to the following formula:

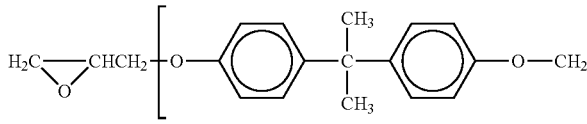

In general, this is a mixture of corresponding compounds of the bisphenol epoxy resin formula above with varying repeat number m of the unit in the square brackets. The bisphenol epoxy resin here is especially chosen such that the average of m is 0.07 to 16.4, i.e. the number-average molar masses are between about 350 g/mol and 4750 g/mol.

In a further preferred manner, the hydrolyzable alkoxysilane is either a compound conforming to the general formula

where p is 0 or 1, $R^X$ is a $C_1$-$C_{20}$ alkyl group, an aryl group or an unsaturated aliphatic hydrocarbyl group that may have a functional group bonded directly to a carbon atom, RY represents a hydrogen atom or a lower alkyl group, and the RY radicals may be the same or different, or the hydrolyzable alkoxysilane is a partial condensate of the compound mentioned. The functional group bonded directly to a carbon atom may, for example, be a vinyl group, mercapto group, epoxy group, glycidoxy group etc. The lower alkyl group may, for example, be an unbranched or branched alkyl group having 6 or fewer carbon atoms.

Examples of the hydrolyzable alkoxysilane include tetramethoxysilane, tetraethoxysilane, tetrapropoxysilane, tetraisopropoxysilane, tetrabutoxysilane and similar tetraalkoxysilanes; methyltrimethoxysilane, methyltriethoxysilane, methyltripropoxysilane, methyltributoxysilane, ethyltrimethoxysilane, ethyltriethoxysilane, n-propyltrimethoxysilane, n-propyltriethoxysilane, isopropyltrimethoxysilane, isopropyltriethoxysilane, vinyltrimethoxysilane, vinyltriethoxysilane, 3-glycidoxypropyltrimethoxysilane, 3-glycidoxypropyltriethoxysilane, 3-mercaptopropyltrimethoxysilane, 3-mercaptopropyltriethoxysilane, phenyltrimethoxysilane, phenyltriethoxysilane, 3,4-epoxycyclohexylethyltrimethoxysilane, 3,4-epoxycyclohexylethyltriethoxysilane and similar trialkoxysilanes; or partial condensates of these compounds. Among these compounds, preference is given to tetramethoxysilane, tetraethoxysilane and similar tetralkoxysilanes or partial condensates thereof. Particular preference is given to poly(tetramethoxysilane), which is a partial condensate of tetramethoxysilane, represented by the formula

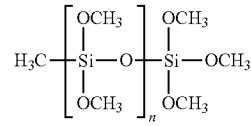

(where the average of n is 1 to 7). The poly(tetramethoxysilane) represented by the formula above may contain a molecule in which n is 0, provided that the average of n is 1 or greater. The number-average molar mass of the poly (tetramethoxysilane) is preferably about 260 to about 1200. In addition, poly(tetramethoxysilane) is non-toxic, by contrast with tetramethoxysilane.

In a further preferred procedure, the epoxy resin used is a silane-modified epoxy resin obtainable by modifying bisphenol diglycidyl ether with alkoxysilanes bearing an epoxy group. Such silane-modified epoxides and the preparation process therefor are described in U.S. Pat. No. 8,835,574 A, the disclosure content of which is likewise incorporated into this document by reference. In the process outlined therein, the epoxyalkoxysilane is partly hydrolyzed and partly condensed in the presence of water. In a second step, a bisphenol diglycidyl ether is added and bound to the partial siloxane condensate.

In a further synthesis route for silane-modified epoxy resins usable advantageously in accordance with the invention, alkoxysilanes containing an isocyanate group are bound to the aliphatic hydroxyl groups to form a urethane group.

The proportion of the silane-modified epoxy resins based on the total amount of epoxy resins in the curable composition may be between 0% and 100%. In order to reduce adsorption onto particular siliconized liners, comparatively smaller proportions—for example 5% to 25%—are chosen. For balanced performance even after storage under moist and hot conditions, proportions between 10% and 50% by weight, especially 20% to 40% by weight, have been found to be excellent.

Epoxy resins used in accordance with the invention may also very advantageously be fatty acid-modified epoxides.

Fatty acid-modified epoxy resins used are preferably epoxy resin esters, also called epoxy esters, i.e. the esterification products of epoxy resins with saturated or unsaturated fatty acids.

It is possible for a single fatty acid-modified epoxy resin or for two, three or even more fatty acid-modified epoxy resins to be present in the curable composition. The curable composition may be limited to the fatty acid-modified epoxy resins as curable reactive resins. As well as the fatty acid-modified epoxy resins, it is also possible for further, non-fatty acid-modified epoxy resins to be present—for example elastomer-modified, especially nitrile rubber-modified, epoxy resins and/or silane-modified epoxy resins, as individually set out in detail in this document, and/or else reactive resins that are not epoxy resins. If a single fatty acid-modified epoxy resin is present, this may especially be selected from the fatty acid-modified epoxy resins described as preferred hereinafter. If multiple fatty acid-modified epoxy resins are present, advantageously at least one of the epoxy resins is one of the compounds described hereinafter as preferred fatty acid-modified epoxy resins. Further preferably, all fatty acid-modified epoxy resins are those as described as preferred hereinafter.

The chemical modification of epoxy resins can be utilized for control of the properties of adhesives. Modified epoxy resins of the invention are especially selected from fatty acid-modified epoxy resins. Fatty acid group-modified epoxy resins are those epoxy resins to which one or more fatty acids are chemically bound, especially by esterification reactions.

The epoxy resin base used for the fatty acid-modified epoxy resins, especially epoxy esters, may especially be epoxy resins of the bisphenol A/epichlorohydrin type according to the general formula already introduced above acids. The esterification typically first opens up the two epoxy rings, followed by the reaction of the hydroxy groups.

Each epoxy group here is equivalent to 2 hydroxy groups since the reaction of an acid group with an epoxide gives rise to a (3-hydroxy ester. These β-hydroxy groups can also react with fatty acids. The preparation is typically effected at temperatures of 240-260° C. under protective gas atmosphere, preferably under azeotropic conditions, in order to remove the water of reaction released. Optionally, the reaction is accelerated by addition of catalysts, for example calcium or zinc soaps, of for example fatty acids such as stearic acid. According to the desired property, 40% to 80% of the functional groups available in the epoxy resin are reacted with fatty acids.

An epoxy resin of the n type (corresponding to the number of free OH groups along the chain) can theoretically bind an average of not more than n+4 fatty acid molecules per epoxy resin molecule (esterification level 100%). Accordingly, in the case of epoxy resin esters, the "oil length" is defined as follows:
short-oil: esterification level 30-50%;
mid-oil: esterification level 50-70%;
long-oil: esterification level 70-90%.

Examples of fatty acids of good suitability in accordance with the invention for the esterification include coconut oil fatty acid, ricinene fatty acid (fatty acid of dehydrogenated castor oil), linseed oil fatty acid, soya oil fatty acid or tall oil fatty acid.

Further fatty acids that are advantageous in accordance with the invention are α-linolenic acid, stearidonic acid, eicosapentaenoic acid, docosahexaenoic acid, linoleic acid, γ-linolenic acid, dihomo-gamma-linolenic acid, arachidonic acid, docosa-7,10,13,16-tetraen-1-oic acid, palmitoleic acid, vaccenic acid, oleic acid, elaidic acid, gadoleic acid, 13-eicosenoic acid, erucic acid, nervonic acid, stearic acid, Mead's acid.

Also usable are dimers and oligomers of unsaturated fatty acids, for example the dimers of tall oil fatty acids.

The proportion of the fatty acid-modified epoxy resins based on the total amount of epoxy resins in the curable composition may be between 0% and 100%. For bonds having particularly high bond strengths even at high temperatures, comparatively lower proportions—for example 5% to 25% by weight—are chosen. For good performance even after storage under moist and hot conditions, proportions between 10% and 50% by weight, especially 20% to 40% by weight, have been found to be excellent.

Preparation Processes

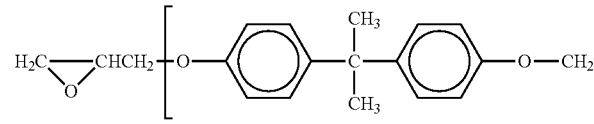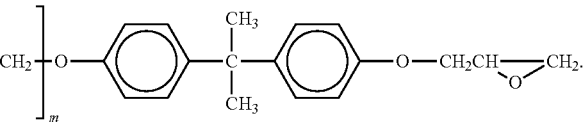

The basis chosen for the fatty acid-modified epoxides is the bisphenol epoxy resin of the formula above, especially such that the average of m=0.07 to 16.4, i.e. the number-average molar masses are between about 350 g/mol and 4750 g/mol. Particular preference is given to using compounds of the formula 1 with m=2.3 to m=10 in pure form (with integer values for m) or in the form of mixtures (corresponding to number-average molar masses between about 1000 and about 3000 g/mol).

Both the terminal epoxy groups and secondary hydroxy groups of bisphenol-based epoxy resins can react with fatty The adhesives used in accordance with the invention can in principle be prepared by the processes known to the person skilled in the art.

A very gentle process by which it is possible to process even raw materials that are difficult to process, such as non-thermoplastic elastomers—for example nitrile rubbers—is extrusion, especially using a planetary roll extruder. It is possible thereby even to incorporate the sensitive components of the curable composition, such as reactive resins and curing agents, without prior reaction of these components or other problems in the process. Such a prior reaction would already cure or at least partly cure the adhesive tape and be at odds with the aim of a storable transportable adhesive tape which is to be cured only after application.

Planetary roll extruders as a continuously operating unit have been known for some time and were first used in the processing of thermoplastics, for example PVC, where they were used mainly for charging of the downstream units, for example calenders or roll systems. Their advantage of high surface renewal for material and heat exchange, with which the energy introduced via friction can be removed rapidly and effectively, and of short residence time and narrow residence time spectrum, has allowed their field of use to be broadened recently to processes including compounding processes that require a mode of operation with exceptional temperature control.

Planetary roll extruders consist of multiple parts, namely a revolving central spindle, a housing that surrounds the central spindle at a distance and has inner teeth and planetary spindles that revolve in the cavity between central spindle and internally toothed housing like planets around the central spindle. Where reference is made hereinafter to inner teeth of the housing, this also includes a multipart housing with a bushing that forms the inner teeth of the housing. In the planetary roll extruder, the planetary spindles mesh both with the central spindle and with the housing that has teeth on the inside. At the same time, the planetary spindles slide against a stop ring by their end that points in conveying direction. Planetary roll extruders, compared to all other designs of extruder, have extremely good mixing action but much lower conveying action.

Planetary roll extruders exist in various designs and sizes according to the manufacturer. According to the desired throughput, the diameters of the roll cylinders are typically between 70 mm and 400 mm.

Planetary roll extruders generally have a filling section and a compounding section.

The filling portion, generally corresponding to a filling zone, consists of a conveying screw onto which all the solid-state components—in the present case especially the non-thermoplastic elastomers and any further components—are metered continuously. The conveying screw then transfers the material to the compounding section. The region of the filling section with the screw is preferably cooled in order to avoid caking of material on the screw. But there are also embodiments without a screw section, in which the material is applied directly between central and planetary spindles. However, this is of no significance for the efficacy of the process according to the invention. The central spindle can preferably also be cooled.

The compounding section typically consists of a driven central spindle and several planetary spindles that rotate around the central spindle within a roll cylinder having internal helical gearing. The speed of the central spindle and hence the peripheral velocity of the planetary spindles can be varied and is thus an important parameter for control of the compounding process. The compounding portion may be formed by a single compounding cell or by a sequence of multiple, mutually separated compounding zones, separated especially by stop rings and possibly additional injection or dispersing rings. The number and arrangement of the planetary spindles may vary from compounding zone to compounding zone. Typically, the compounding portion will preferably consist of at least two, but more preferably of three or four, coupled roll cylinders, with each roll cylinder having one or more separate temperature control circuits.

The surrounding housing has a jacket, in a contemporary design. The inner shell is formed by a bushing provided with internal teeth. Provided between inner shell and outer shell is the important cooling of the planetary roll extruder.

The planetary spindles do not require guiding in circumferential direction. The teeth ensure that the separation of the planetary spindles in circumferential direction remains the same. This can be referred to as self-guiding.

The materials are circulated between the central and planetary spindles, i.e. between planetary spindles and the helical gearing of the roll section, such that the materials are dispersed under the influence of shear energy and external temperature control to give a homogeneous compound.

The number of planetary spindles that rotate in each roll cylinder can be varied and hence adapted to the demands of the process. The number of spindles affects the free volume within the planetary roll extruder and the residence time of the material in the process, and additionally determines the size of the area for heat and material exchange. The number of planetary spindles affects the compounding outcome via the shear energy introduced. Given a constant roll cylinder diameter, it is possible with a greater number of spindles to achieve better homogenization and dispersion performance, or a greater product throughput. For achievement of a good ratio of compounding quality to product rate, at least half or even at least 3/4 of the possible number of planetary spindles should preferably be used.

The maximum number of planetary spindles that can be installed between the central spindle and roll cylinder is dependent on the diameter of the roll cylinder and on the diameter of the planetary spindles used. In the case of use of greater roll diameters as necessary for achievement of throughputs on the production scale, or smaller diameters for the planetary spindles, the roll cylinders can be equipped with a greater number of planetary spindles. Typically, up to seven planetary spindles are used in the case of a roll diameter of D=70 mm, while ten planetary spindles, for example, can be used in the case of a roll diameter of D=200 mm, and 24, for example, in the case of a roll diameter of D=400 mm.

It will be appreciated that each roll cylinder may be equipped differently with regard to the number and type of planetary spindles and hence be matched to the respective formulation-related and process-related demands.

According to the invention, it has been possible to provide storage-stable curable epoxy-based compositions that are of excellent suitability as adhesives in adhesive tapes and with which it is suitable to create even very thick adhesive tapes. The products produced have very good adhesion, especially to glass surfaces. By virtue of the components chosen, it has been possible to reduce or entirely avoid solubility of the curing agents used in the other components, which affords very storage-stable products that have good transportability and storability and ensure their full bonding performance even on customer employment—even after prolonged storage time.

The curing of the adhesives or adhesive tapes of the invention after application can advantageously be affected at temperatures between 120° C. and 200° C. for 10 to 120 minutes. The exact conditions are guided by the curing agent used and any accelerator used and the amount of accelerator used. Typically, accelerators are used between 0.5 phr and 5 phr, with phr relating to the amount of epoxy resins used. Illustrative curing conditions are 30 minutes at 180° C., 30 minutes at 160° C., 35 minutes at 145° C., 60 minutes at 130° C., 120 minutes at 120° C.

According to the invention, it is possible to create very thick adhesive tapes. The presentation of intrinsically highly viscous adhesives in the form of stable films—for instance by the embedding of the reactive adhesive into a polymeric film former matrix—with the adhesives of the invention opens up access to very storage-stable adhesive films in a wide variety of dimensions.

For instance, it is possible to offer adhesive films in very thin form—for example from a thickness of a few μm—through customary adhesive tape thicknesses, for instance with adhesive layers of thickness 25 μm up to 100 μm—for instance 50 μm-thick adhesive layers, up to adhesive tapes having very thick adhesive layers of more than 100 μm, preferably of more than 200 μm, even of 300 μm or more, 500 μm or more, 1 mm or more, up to adhesive layers in the region of a few millimeters and even centimeters.

The general expression "adhesive tape" encompasses a carrier material provided with an adhesive on at least part of one or both sides. The carrier material includes any flat structures, for example sections elongated in two dimensions, tapes having extended length and limited width, tape sections, die-cut parts (for example in the form of edges or boundaries of an arrangement to be bonded), other shaped articles, multilayer arrangements and the like.

For particular applications, it may be desirable for one or both sides of the adhesive tape not to be provided completely with adhesive, but for partly adhesive-free regions to be provided.

Adhesive tapes coated with adhesives on one or both sides are usually wound at the end of the production process to give a roll in the form of an Archimedean spiral or in cross-wound form. In order to prevent the adhesives from coming into contact with one another in the case of double-sided adhesive tapes, or in order to prevent the adhesive from sticking to the carrier in the case of single-sided adhesive tapes, the adhesive tapes may advantageously be covered with a liner on one or both sides prior to winding, which is wound up together with the adhesive tape.

In one embodiment of the invention, the elongated article is a cable harness comprising a bundle of multiple cables, such as 3 to 1000 cables, preferably 10 to 500 cables, especially between 50 and 300 cables.

Carriers used may be any known films and textile carriers such as loop-drawn knits, scrims, tapes, braids, tufted textiles, felts, weaves (including plain weave, twill weave and satin weave), loop-formed knits (including warp-knitted fabric and knitwear fabric) or nonwovens, with "nonwoven" being understood to mean at least textile fabrics according to EN 29092 (1988) and also stitch-bonded fiber webs and similar systems. A particularly advantageous adhesive tape is one in which the carrier used is a weave, a nonwoven or a knit. Such carriers are described, for example, in WO 2015/004190 A1, to which full reference is made here.

In addition, it is possible to use spacer weaves and knits with lamination. Such spacer weaves are disclosed in EP 0 071 212 B1. Spacer weaves are mat-shaped layered products having a top layer composed of a fibrous or filamentous web, a bottom layer and, between these layers, individual or bunches of holding fibers needled through the particle layer in a distributed form across the area of the layered product to join the top and bottom layer together.

Particularly useful as nonwoven materials are consolidated staple fiber webs, but also filament, meltblown and spunbonded webs, which usually have to be consolidated additionally. Known possible consolidation methods for nonwovens are mechanical, thermal and chemical consolidation. Particularly advantageous nonwovens have been found to be those that have especially been consolidated by overstitching with separate filaments or by interlooping. Consolidated nonwovens of this type are produced, for example, on stitch-bonding machines of the "Malimo" type from Karl Mayer, formerly Malimo, and can be sourced from Hoftex Group AG inter alia.

The carrier used may also be a nonwoven of the Kunit or Multiknit type. A Kunit nonwoven is characterized in that it originates from the processing of a longitudinally oriented fiber web into a sheetlike structure which has the loops on one side, and, on the other, loop feet or pile fiber folds, but possesses neither threads nor prefabricated sheetlike structures. A nonwoven of this kind has also long been produced, for example, on stitch-bonding machines of the "Malimo" type from Karl Mayer.

A Multiknit nonwoven is characterized in relation to the Kunit nonwoven in that the nonwoven is consolidated on both the top and bottom sides by the double-sided needlepunching. Starting materials used for a Multiknit are generally one or two single-sidedly interlooped pile fiber nonwovens produced by the Kunit method. In the end product, the two top sides of the nonwoven are shaped by interlooped fibers to form a continuous surface and bonded to one another by fibers virtually at right angles to one another. It is possible to additionally introduce further needle-penetrable fabric and/or scatterable media.

Finally, stitchbonded webs are also suitable as a precursor for forming a carrier of the invention and an adhesive tape of the invention. A stitchbonded web is formed from a nonwoven material with a multitude of threads running parallel to one another. These threads arise from the stitching-in or stitchbonding of continuous textile filaments. For this type of nonwoven, stitchbonding machines of the "Malimo" type from Karl Mayer are known.

Needlefelt webs are also particularly suitable. In needlefelts, a tuft of fibers is made into a fabric with the aid of barbed needles. By repeatedly inserting and pulling out the needles, the material is consolidated on a needle bar, with the individual fibers being interlooped to form a fixed fabric.

Also particularly advantageous is a staple fiber web which has been preconsolidated in the first step by mechanical processing, or which is a wetlaid web that has been laid hydrodynamically, with between 2% by weight and 50% by weight of the fibers of the web being fusible fibers, especially between 5% by weight and 40% by weight of the fibers of the web. Such a web is characterized in that the fibers are wetlaid or, for example, a staple fiber web is preconsolidated by the formation of loops from fibers of the web by needling, stitching, airjet and/or waterjet processing. In a second step, thermosetting is effected, with the strength of the web being increased once again by the melting or partial melting of the fusible fibers.

Advantageously and at least in some regions, the carrier has a polished surface on one or both sides, preferably a fully polished surface on each side. The polished surface may have been chintzed, as elucidated, for example, in EP 1 448 744 A1. In this way, soil repellency is improved.

Starting materials used for the carrier are especially (synthetic) fibers (staple fibers or continuous filament) of synthetic polymers, also called synthetic fibers, made of polyesters such as polyethylene terephthalate, polyamide, polyimide, aramid, polyolefin, polyacrylonitrile or glass, (synthetic) fibers of natural polymers such as cellulosic fibers (viscose, Modal, Lyocell, Cupro, acetate, triacetate, Cellulon), such as rubber fibers, such as plant protein fibers and/or such as animal protein fibers and/or natural fibers of cotton, sisal, flax, silk, hemp, linen, coconut or wool. But the present invention is not limited to the materials mentioned; instead, it is possible, as is apparent to the person skilled in the art without having to exercise inventive skill, to use a multitude of further fibers for production of the web.

Likewise additionally suitable are yarns manufactured from the raw materials specified. In the case of weaves or scrims, it is possible to produce individual fibers from a mixed yarn, i.e. having synthetic and natural constituents. In general, however, the warp threads and the weft threads are each formed from one type of material.

The material used for the carrier is preferably polyester, on account of the excellent ageing resistance and excellent media resistance with respect to chemicals and operating media such as oil, gasoline, antifreeze and the like. Furthermore, polyester has the advantage that they lead to a very abrasion-resistant and thermally stable carrier, which is of particular importance for the specific end use for bundling of cables in automobiles and in the engine compartment, for example. In one embodiment of the invention, the carrier used is a PET nonwoven or a PET weave.

Advantageously, the basis weight of the textile carrier is between 30 g/m$^2$ and 300 g/m$^2$, further advantageously between 50 g/m$^2$ and 200 g/m$^2$, particularly advantageously between 50 g/m$^2$ and 150 g/m$^2$, very particularly advantageously between 70 g/m$^2$ and 130 g/m$^2$.

In a particularly advantageous embodiment of the invention, the carrier used is a weave or nonwoven made of polyester that has a basis weight between 50 g/m$^2$ and 150 g/m$^2$.

Advantageously, the coatweight of the binder applied to the carrier and/or introduced into the carrier is between 30 g/m$^2$ and 500 g/m$^2$, further advantageously between 40 g/m$^2$ and 400 g/m$^2$, particularly advantageously between 50 g/m$^2$ and 300 g/m$^2$.

The introduction into the carrier, especially into a nonwoven or woven carrier, can be effected, for example, by extrusion coating of the carrier with the thermally curable composition.

The processing temperature of the carrier coated with the adhesive and the thermally curable adhesive layer should not exceed 60° C. in the course of drying, in order to prevent premature reaction. The same applies to the storage temperature.

The ready-coated material is preferably cut into a width of 20±2 mm (any other width is likewise conceivable) and wound in spiral form around the bundle of cables that has been brought into shape with an overlap of 50%. For the activation of the thermally curable adhesive layer, a thermal treatment at 110° C. for 10 min is necessary. The thermal treatment can be effected by means of a hot air gun, IR source, oven, heating jacket, or the like.

In a preferred embodiment of the invention, the adhesive, after application to the carrier, has sunk into the carrier to an extent of more than 10%, preferably to an extent of more than 25%, further preferably to an extent of more than 50%. What is meant here by a numerical value of 25%, for example, is that the adhesive has penetrated over a layer thickness of 25% of the thickness of the textile carrier, i.e. over a layer thickness of 25 μm within a carrier having a thickness of 100 μm, beginning from the surface of the carrier on which the adhesive has been coated, and at right angles to the plane formed by the longitudinal/cross direction.

The ready-coated material is preferably provided with a protective film.

The present invention provides a method of jacketing elongate items, such as wires or cable looms in particular, wherein an adhesive tape is run in a helical line around the elongate item or the elongate item is wrapped by the adhesive tape in axial direction, the elongate item together with the wrapping adhesive tape is put in the desired arrangement, especially in the cable loom map, the elongate item is held in this arrangement, the curable adhesive is made to cure by the supply of heat at a temperature of up to 110° C., preferably between 60° C. and 110° C. Preference is given to supplying the thermal energy over a period of 0.5 sec to 10 min, preferably 2 min to 6 min, which is compatible with the cycle times of the manufacturing process, such that the elongate material has fully cured as soon as it is installed in the target object, such as automobiles, watercraft or aircraft.

The tape is preferably wound around the elongate material in a spiral with an overlap of 30% to 70%, more preferably 40% to 50%, especially about 50%.

Finally, the present invention also relates to a cable harness wrapped with the cured adhesive tape and to a cable harness produced by the method of the invention.

Figure 2:
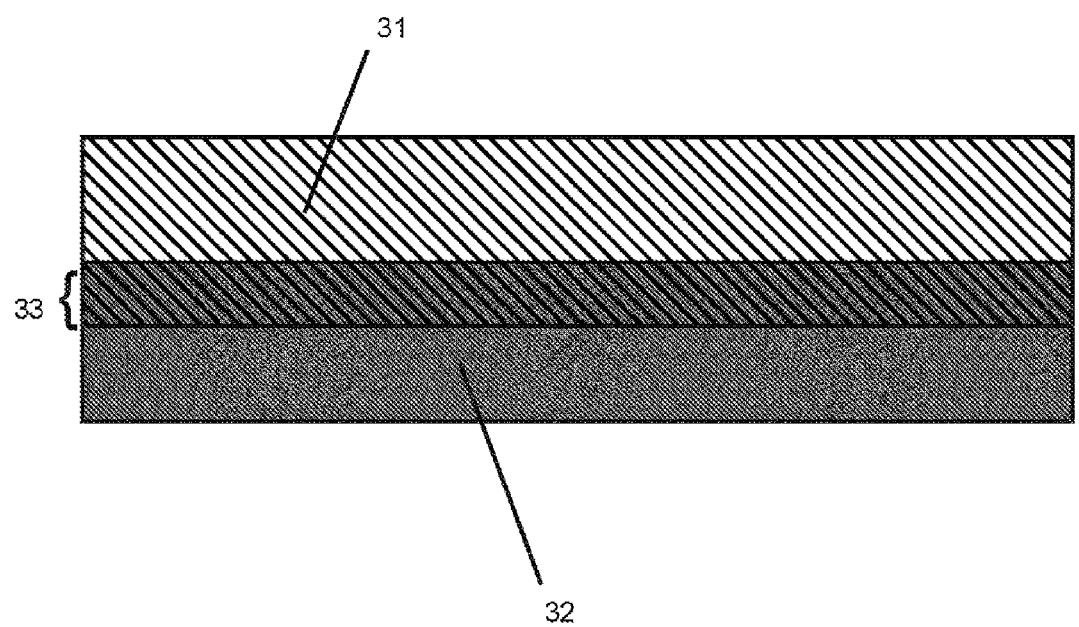
FIG. 2 is a cross-section of one embodiment of an adhesive tape of the present invention.
Figure 3:
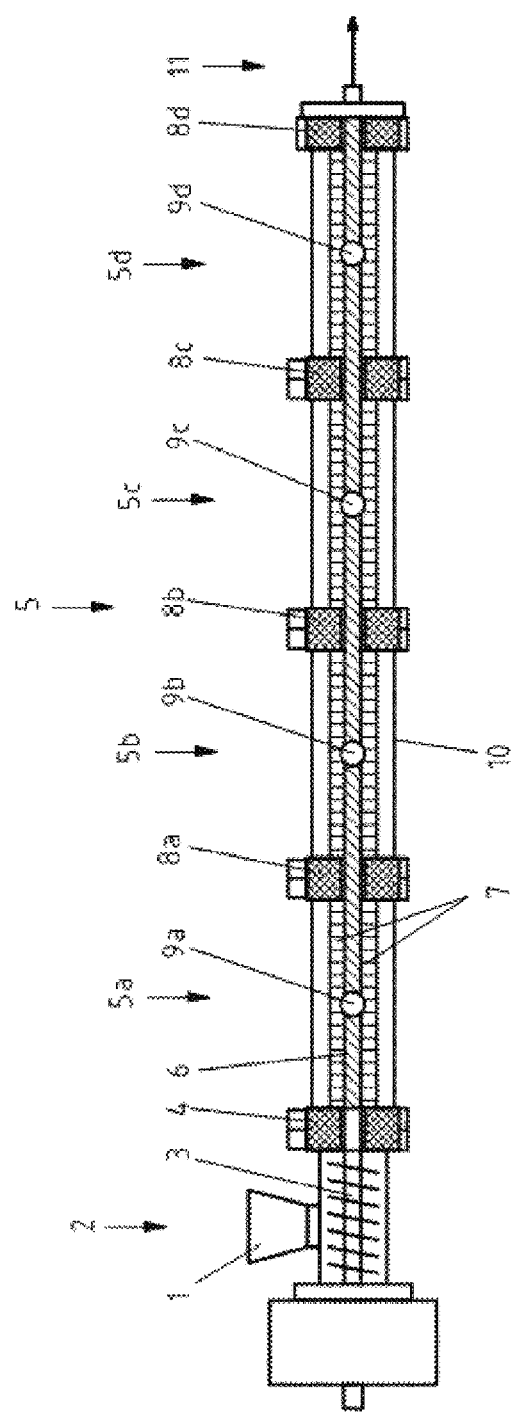
FIG. 3 is a side view of an planetary roller extruder configuration used in the examples.

FIG. 2 shows, in a section in cross direction (cross section), the adhesive tape consisting of a nonwoven carrier 31 to which a layer of a curable adhesive 32 has been applied on one side, which is additionally self-adhesive.

The adhesive has sunk into the carrier to an extent of 25% (33), which results in optimal anchoring.

Likewise encompassed by the concept of the invention are a jacketed elongate article, such as a cable loom in particular, jacketed with an adhesive tape of the invention, and a vehicle comprising such a wrapped elongate article.

Test Methods

The following test methods were used to briefly characterize the specimens produced:

Viscosity

A measure of the flowability of the fluid coating material is dynamic viscosity. Dynamic viscosity is determined to DIN 53019. A viscosity of less than 10$^8$ Pas is described as fluid. Viscosity is measured in a cylindrical rotary viscometer with a standard geometry according to DIN 53019-1 at a measurement temperature of 23° C. and a shear rate of 1 s$^{-1}$.

Molar Mass

Figures for number-average molar mass Mn or for weight-average molar mass Mw are based on measurement by means of gel permeation chromatography (GPC) as follows:

The eluent used was THF (tetrahydrofuran) with 0.1% by volume of trifluoroacetic acid. The measurement was made at 25° C. The precolumn used was PSS-SDV, 5μ, 10$^3$ Å, ID 8.0 mm×50 mm. Separation took place using the columns PSS-SDV, 5μ, 10$^3$ and also 10$^5$ and 10$^6$, each with ID 8.0 mm×300 mm. The sample concentration was 4 g/l; the flow rate was 1.0 ml per minute. Measurement was effected against polystyrene standards.

Softening Temperatures of Polymers/Resins

The softening temperature, unless stated otherwise in the individual case, is determined by the standard methodology, which is known as the Ring and Ball method and is standardized in ASTM E28.

The softening temperature is determined using a Herzog HRB 754 Ring and Ball tester. The samples to be analyzed—for instance the resin or elastomer—are first finely crushed by mortar and pestle. The resulting powder is introduced into a brass cylinder open at the base (internal diameter in the upper part of the cylinder 20 mm, diameter of the base opening of the cylinder 16 mm, height of the cylinder 6 mm)

and melted on a hot stage. The filling volume is chosen such that the sample after melting fills the cylinder fully without excess.

The resulting specimen together with the cylinder is placed into the sample holder of the HRB 754. The equilibration bath is filled with glycerol if the softening temperature is between 50° C. and 150° C. At lower softening temperatures, it is also possible to work with a water bath. The test balls have a diameter of 9.5 mm and weigh 3.5 g. In accordance with the HRB 754 procedure, the ball is arranged above the test specimen in the equilibration bath and placed onto the test specimen. 25 mm beneath the base of the cylinder is a collector plate, and 2 mm above the latter is a light barrier. During the measurement process, the temperature is increased at 5° C./min. In the temperature range of the softening temperature, the ball begins to move through the base opening of the cylinder until it finally comes to rest on the collector plate. In this position, it is detected by the light barrier and the temperature of the equilibration bath at this time is registered. A double determination takes place. The softening temperature is the average from the two individual measurements.

Further reference methods are apparent from the test methods in the experimental section.

Experimental Section

In some examples of the experimental section, a planetary roll extruder from ENTEX Rust&Mitschke was used. The planetary roll extruder configuration which is used in the examples is shown by FIG. 1; the figure simultaneously serves to illustrate the basic construction of a planetary roll extruder by way of example.

The planetary roll extruder has a filler section (2) and a compounding section (5), consisting of four roll cylinders (5a to 5d) in sequence, each corresponding to a compounding zone. The roll cylinder 5a corresponds here to the first compounding zone. Within a roll cylinder, the planetary spindles (7) driven by the revolution of the central spindle (6) exchange the materials between central spindle (6) and planetary spindles (7), or between planetary spindles (7) and the wall (10) of the roll cylinder (5a to 5d).

At the end of each roll cylinder (5a to 5d) is a stop ring (8a to 8d) that holds the planetary spindles (7) in a fixed manner.

Via the fill opening (1), it is possible to dose components, for example elastomers, fillers, antioxidants etc., onto the conveying screw (3) of the filler section (2) of the planetary roll extruder. The conveying screw (3) then transfers the materials to the central spindle (6) of the first roll cylinder, i.e. the first compounding zone (5a). For improvement of the material intake between central spindle (6) and planetary spindles (7), four long and three short planetary spindles (7) are used in the first roll cylinder (5a) in the experiments; other arrangements are also implementable in general.

The internally hollow conveying screw (3) and central spindle (6) are connected to one another in a force-fitting manner and have a common temperature control circuit. Each roll cylinder (5a to 5d) of the compounding section (5) has independent temperature control. A further temperature control circuit can be used to cool the filler section (2). The temperature control medium used may be water.

The dosage, especially of the epoxy resins used for digestion, but also of other components, may be effected, for example, via the injection ring (4) upstream of the first roll cylinder (5a) or via the stop rings (8a to 8d) provided with holes or in a combination of the two options. The roll cylinders (5a to 5d) are provided with an opening for lateral feeding in about the middle of the cylinders. These can be used, if required, to add liquid or solid components—such as further reactive resins and crosslinkers in particular—via lateral feeders (9a to 9d).

The temperature of the pressure-sensitive adhesive is ascertained by means of probes in the product outlet (11).

Storability

The storability (Lf) of the adhesive tapes was determined via DSC. For this purpose, the heat of reaction of specimens that have been stored for 10 d at 40° C. ($\Delta H_{10d40}$) and for 10 d at 60° C. ($\Delta H_{10d60}$) was determined and expressed in comparison to the heat of reaction of a freshly produced specimen ($\Delta H_{fresh}$)

$$Lf_{40}=\Delta H_{10d40}/\Delta H_{fresh} \text{ and}$$

$$Lf_{60}=\Delta H_{10d60}/\Delta H_{fresh}$$

The storability thus corresponds to the percentage residual reactivity of the reactive adhesive tapes. In some cases, the heat of reaction measured for the stored samples was minimally greater than that of the fresh specimen. In these cases, storability is set to 1.

Tip Shear Test

Figure 4:
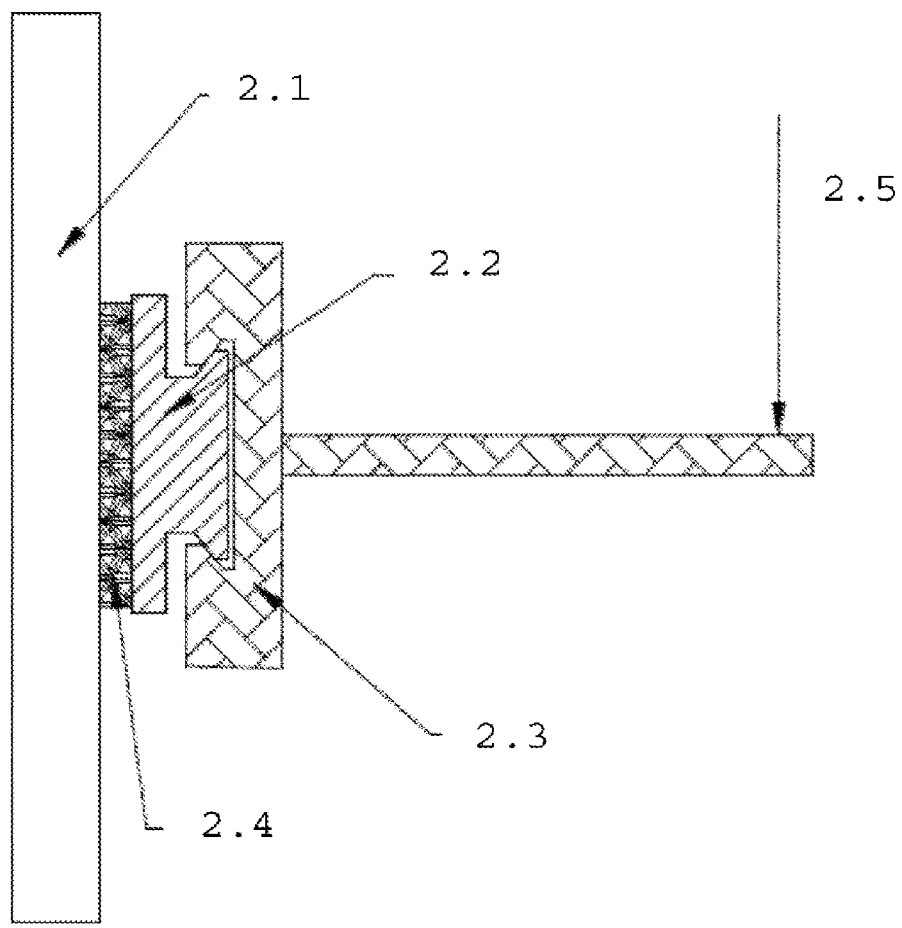
FIG. 4 is a schematic illustrating an apparatus for conducting a tip shear test.

See FIG. 4. A steel mold (2.2) with a flat base in the form of plate; edge length about 2.5 cm×2 cm; and shaped on the other side for securing of a lever (2.3), said mold having first been provided with a 2.0 cm×2.0 cm and 500 µm-thick adhesive layer (2.4) on the flat base, is stuck onto a glass substrate (2.1) in a blister-free manner, and pressed on with a 2 kg weight for one minute. The adhesive (2.4) was cured at 145° C. within 30 minutes; this was followed by storage under hot and moist conditions in a climate-controlled cabinet at 65° C. and 90% RH. The tip shear test was assessed in a Zwick tensile tester with a 20 kN test head. For this purpose, a lever (2.3) is secured to the bonded steel mold (2.2), as shown in FIG. 4. The machine pushes the lever downward (pressure illustrated by arrow 2.5) until the glass-steel bond fails.

The result of the measurement is the fracture profile. Adhesive (A) means that the adhesive (2.4) has been removed without residue from the glass plate (2.2). Cohesive (C) means that residues of the adhesive (2.4) are to be found both on the flat base of the steel mold (2.2) and on the glass substrate (2.1).

Thermoplasticity

Thermoplasticity/non-thermoplasticity was determined on a laboratory hotplate from Ikamag. A square steel plate corresponding to the specification of ISO 29862:2007, section 5.3.3, was placed onto the hotplate, but with an edge length such that the hotplate was completely covered, and a thickness of 1.1 mm. The temperature of the surface of the steel plate remote from the hotplate is measured with a temperature sensor. The polymer to be tested (a cube of height, width, depth about 2 cm×2 cm×2 cm), or an aggregate of pellets in the case of pellets, was placed onto the middle of the free surface of the steel plate.

Three test series each with identical specimens of the polymer to be tested were run, in which the steel plate in one test series was heated to a temperature of 150° C., in the second test series to a temperature of 200° C., and in the third test series to a temperature of 250° C. (heating rate in each case about 1° C. per second, determination of the temperature by means of the temperature sensor). The sample was kept at the particular end temperature for 1 minute, and then the steel plate was tilted to an angle of 60° (based on the planar, horizontal base).

The sample measured is considered to be non-thermoplastic at least up to the respective temperature if it falls/rolls off the plate of its own accord on tilting.

The sample measured is considered to have a thermoplastic behavior even below a particular temperature if it sticks to the plate for at least 2 seconds at the respective temperature in the test—and hence has adapted by at least partial melting, i.e. if it does not fall/roll off the plate of its own accord within a period of 2 seconds.

Raw Materials Used:

Breon N41H80 Hot-polymerized nitrile-butadiene rubber having an acrylonitrile content of 41% by weight. Mooney viscosity according to the technical data sheet of 70 to 95. Non-thermoplastic up to 250° C. according to test method for thermoplasticity. Manufacturer/supplier: Zeon Chemicals.

Araldite ECN Solid epoxy-cresol novolak having a softening 1273 temperature of 68 to 78° C. and an EEW of 217 to 233 g/eq. Manufacturer/supplier: Huntsman.

Araldite Solid difunctional bisphenol A/epichlorohydrin GT7072 epoxy resin having an EEW of 570 to 595 g/eq and a softening temperature of 82 to 90° C. Manufacturer/supplier: Huntsman.

Epon 828 difunctional bisphenol A/epichlorohydrin liquid epoxy having a weight per epoxy of 185 to 192 g/eq. Viscosity at 25° C. of 12 to 14 Pa s. Manufacturer/supplier: Momentive.

Struktol Nitrile rubber-modified epoxy resin based on PolyDis 3611 bisphenol F diglycidyl ether having an (=Struktol elastomer content of 40% by weight and a weight PD3611) per epoxy of 550 g/eq. Viscosity at 25° C. of 10 000 Pa s. Manufacturer/supplier: Schill+Seilacher.

KSR-177 According to the manufacturer's safety data sheet (MSDS No.: FS-[Rev. 6], issued 2010 Feb. 1, Rev. 6 2013-03-07), a fatty acid-modified epoxy resin having an epoxy equivalent of 190 to 220 g/eq. Viscosity at 25° C. of 9 to 15 Pa s. Manufacturer/supplier: Kukdo Chemical Co Ltd.

Reactive Fatty acid-modified epoxy resin prepared from resin 1 Epon 828 and Sylfat FA1. The reaction product was blended with Epon 828 and adjusted to an EEW of 200 g/eq.

Reactive Silane-modified epoxy resin prepared from 3-resin 2 isocyanatopropyltriethoxysilane (CAS: 24801-88-5) and Araldite GT7072. EEW=650-750 g/eq.

Dyhard 100S Latent curing agent for epoxy systems, consisting of micronized dicyandiamide in which 98% of the particles are smaller than 10 μm. AEW=12-14 g/eq. Manufacturer/supplier: AlzChem.

Curezol 2MA-2,4-Diamino-6-[2"-methylimidazolyl-(1")]-OK ethyl-s-triazine isocyanuric acid adduct dihydrate. CAS: 68490-66-4. Manufacturer/supplier: Shikoku.

Curezol MZ-A 2,4-Diamino-6-[2"-methylimidazolyl-(1")]-ethyl-s-triazine. CAS:38668-46-1. Manufacturer/supplier:Shikoku.

Curezol 2PHZ 2-Phenyl-4,5-dihydroxymethylimidazole. CAS: 61698-32-6. Manufacturer/supplier: Shikoku.

Curezol 2-Ethyl-4-methylimidazole. CAS:931-36-2. 2E4MZ Manufacturer/supplier: Shikoku. Curezol 2PZ 2-Phenylimidazole. CAS: 670-96-2. Manufacturer/supplier: Shikoku.

Curezol 1-Cyanoethyl-2-methylimidazole. CAS: 23996-55-2E4MZ-CN 6. Manufacturer/supplier: Shikoku.

Sylfat FA1 Tall oil fatty acids from Kraton.

Preparation of Modified Reactive Resin 1

In a reaction vessel, 76 g of Epon 828 was mixed with 56 g of Sylfat FA1 and heated to 250° C. The water formed was allowed to evaporate off. The product was used without further purification.

Preparation of Modified Reactive Resin 2

In a round-bottom flask, under a nitrogen atmosphere, 116 g of Araldite GT7072 was dissolved in 500 g of butanone. A dropping funnel was used to gradually add 24.7 g of 3-(triethoxysilyl)propyl isocyanate dropwise to the stirred solution. The reaction was heated to boiling and stirred under reflux for 1 h. Then the cooling was removed, and the solvent and the ethanol formed were evaporated off. The product was used without further purification.

|  | Example: | | | | | | | |
|---|---|---|---|---|---|---|---|---|
|  | K0 pts. by wt. | K1 pts. by wt. | K2 pts. by wt. | K3 pts. by wt. | K4 pts. by wt. | K5 pts. by wt. | K6 pts. by wt. | K7 pts. by wt. |
| Breon N41H80 | 30 | 30 | 30 | 30 | 30 | 30 | 30 | 30 |
| Epon 828 | 20 | 20 | 20 | 20 | 20 |  |  |  |
| Araldite ECN 1273 | 30 | 30 | 30 | 30 | 30 | 30 | 30 | 30 |
| Struktol PD3611 | 20 | 20 | 20 | 20.0 | 20.0 | 20 | 20 | 20 |
| KSR-177 |  |  |  |  |  | 20 |  |  |
| Reactive resin 1 |  |  |  |  |  |  | 20 |  |
| Reactive resin 2 |  |  |  |  |  |  |  | 20 |
| Dyhard 100S | 3.61 | 3.61 | 3.61 | 3.61 | 3.61 | 3.47 | 3.51 | 2.58 |
| Curezol 2MA-OK | 2.1 | 2.1 |  |  |  | 2.1 | 2.1 | 2.1 |
| Curezol MZ-A |  |  | 2.1 |  |  |  |  |  |
| Curezol 2PHZ |  |  |  | 2.1 |  |  |  |  |
| Curezol 2E4MZ-CN |  |  |  |  | 2.1 |  |  |  |
| Curezol 2E4MZ |  |  |  |  |  |  |  |  |
| Curezol 2PZ |  |  |  |  |  |  |  |  |

|  | Example: | | |
|---|---|---|---|
|  | V1 pts. by wt. | V2 pts. by wt. | V3 pts. by wt. |
| Breon N41H80 | 30 | 30 |  |
| Epon 828 | 20 | 20 | 28.4 |
| Araldite ECN 1273 | 30 | 30 |  |

-continued

| | | | |
|---|---|---|---|
| Struktol PD3611 | 20 | 20 | |
| KSR-177 | | | |
| Reactive resin 1 | | | |
| Reactive resin 2 | | | |
| Dyhard 100S | 3.61 | 3.61 | 2.0 |
| Curezol 2MA-OK | | | 0.85 |
| Curezol MZ-A | | | |
| Curezol 2PHZ | | | |
| Curezol 2E4MZ-CN | | | |
| Curezol 2E4MZ | 2.1 | | |
| Curezol 2PZ | | 2.1 | |

Production of the Adhesive Tapes

The adhesives from the examples were produced in a Haake analytical kneader at fill levels between 70% and 80%. Then an initial charge of nitrile rubber and Struktol PD3611 was kneaded with roller paddles at 60° C. until a constant torque was established. Then the further raw materials were added and kneaded. Finally, the curing agent and optionally the accelerator were added and kneaded at material temperature about 80° C. for about 5 minutes.

The adhesive was pressed in a vacuum press to give 500 µm-thick transfer adhesive films in blister-free form between two siliconized PET films.

In a preliminary test, the composition K0 (corresponding to K1 but lacking curing agent Dyhard 100S) was also produced and kneaded for 15 minutes at 95° C. in order to simulate the thermal stress of the extrusion process. After the pressing operation, this adhesive film was whitish, which shows that the accelerator withstands the kneading process in undissolved particulate form and is in dispersed form.

K1 was additionally also produced in a continuous process and is to be found in the assessment table as K1*.

A planetary roll extruder from Entex Rust & Mitschke with four coupled roll cylinders having an internal diameter of 70 mm was used. The first two roll cylinders were each equipped with 7 planetary spindles, and the next two each with 6 planetary spindles. The dispersion ring after the first planetary cylinder had a free cross section of 38 mm, the dispersion ring after the second planetary cylinder a free cross section of 34.5 mm, and the dispersion ring after the third planetary cylinder a free cross section of 34 mm. In the present embodiment of the planetary roll extruder, the filler section has a conveying screw onto which the material can be dosed. The process parameters used are described in detail hereinafter.

Downstream of the planetary roll extruder, a twin screw extruder (TSE) was used as vented extruder (KraussMaffei Berstorff, screw diameter 42 mm, 36 L/D), with application of a reduced pressure of 200 mbar in a degassing zone. The vented extruder was at a temperature of 60° C. throughout, at a speed of 90 rpm. The curing agent was metered in in the first third of the TSE. If curing agent and accelerator were used, mixtures (batches) of Dyhard 100S and the appropriate accelerator were produced in the appropriate mixing ratio and likewise metered in in the first third of the TSE. The mass flow rate reported is accordingly based on a mixture of curing agent and accelerator.

The exit temperature of the adhesive from the planetary roll extruder was in the range from 85° C. to 95° C. After passage through the downstream twin screw extruder, the temperatures were at a comparable level.

| Experiment | Zone 1 mass flow rate/kg/h Breon N41H80 | Zone 1 mass flow rate/kg/h Araldite ECN 1273 | Zone 2 mass flow rate/kg/h Struktol PD3611 | Zone 3 mass flow rate/kg/h Epon828 | Mass flow rate in TSE degassing/ kg/h Dyhard 100S- accelerator batch |
|---|---|---|---|---|---|
| K1* | 7.5 | 7.5 | 5 | 5 | 1.43 |

For the above example, the following process parameters were chosen:

| | Zone 1 | Zone 2 | Zone 3 | zone 4 |
|---|---|---|---|---|
| Number of planets | 7 | 7 | 6 | 6 |
| $T_{roll\ cylinder}$/° C. | 80 | 70 | 60 | 50 |
| $T_{central\ spindle}$/° C. | 30 | 30 | 30 | 30 |
| Dispersing ring diameter/mm | | 38 | 34.5 | 34 |
| Speed/rpm | | | 70 | |

Assessment of the adhesive tapes

| | Example: | | | | | | | |
|---|---|---|---|---|---|---|---|---|
| | K1 | K1* | K2 | K3 | K4 | K5 | K6 | K7 |
| Uncured adhesion (steel)/N cm$^{-1}$ | 8.1 | 9.3 | 7.9 | 8.5 | 8.7 | 8.3 | 8.8 | 8.1 |
| Fracture profile in tip shear test after storage under moist/hot conditions* | A | A | A | A | A | K | K | K |
| Storability Lf$_{40}$ | 0.99 | 0.98 | 0.53 | 0.97 | 0.08 | 0.96 | 1.0 | 0.99 |
| Storability Lf$_{60}$ | 0.78 | 0.73 | 0 | 0.81 | 0 | 0.81 | 0.79 | 0.71 |

| | Example: | | |
|---|---|---|---|
| | V1 | V2 | V3 |
| Uncured adhesion (steel)/N cm$^{-1}$ | n.d. | n.d. | n.d. |
| Fracture profile in tip shear test after storage under moist/hot conditions* | n.d. | n.d. | n.d. |

-continued

| Storability $Lf_{40}$ | 0 | 0 | 0.83 |
| Storability $Lf_{60}$ | 0 | 0 | 0 | n.d. = not determined
*A = adhesive failure at the glass interface
C = complete cohesive failure
Storage conditions: 300 h at 65° C. and 90% RH The adhesive tapes of the invention can be produced via a hotmelt process. If there are preliminary reactions of the reactive system in the production process, this occurs only to a small degree, since all adhesive tapes show very good bonding forces to steel. Counterexamples V1 and V2 with imidazole accelerators without a heteroatom do not show sufficient stability. Thus, there is already a significant rise in the viscosity of the adhesive in the production process, such that the measurement of bonding force and of the tip shear test were not possible.

Comparison of V1 with K4 shows the positive effect on the storability of the cyanoethyl group with otherwise comparable chemical structure. The same applies to the direct comparison of V2 with K3. Both adhesives contain a 2-phenylimidazole-based accelerator. In K3, however, the accelerator has additionally been functionalized with hydroxy groups. One disadvantage of the accelerator in K3 is the high curing temperature required, associated with the high stability. By contrast with all other examples, K3 was cured at 160° C. for 30 minutes.

Much stronger acceleration is accomplished by the triazine-modified imidazoles as used by way of example in K1, K1* and K2. Although the adhesives can be cured at 140° C., the accelerators are much more stable compared to unmodified imidazoles as used in V1 and V2. In the direct comparison of the two triazine-modified imidazoles, the additionally acid-stabilized accelerator in K1 is found to be particularly storage-stable. It has been found that, surprisingly, adhesives having high melt viscosities in the temperature range that occurs in the course of production, for example 90° C., show much better storabilities than low-viscosity epoxy resins. This is shown by way of example in the comparison of K1 with V3. In V3, the same curing agent-accelerator system of K1 is used, but in a low-viscosity epoxy resin (~10 Pa s at 23° C. and well below 1 Pa s at 90° C.) Storabilities differ significantly. This is already shown in the storage at 40° C. and is even more marked in the storage at 60° C. V3 has already cured in the 60° C. storage, whereas K1 is still found to be relatively stable. The melt viscosity at 90° C. (complex viscosity $\eta^*$ measured by means of DMA temperature sweep with a heating rate of 0.1° C./min) was above 100 Pa s for all adhesives K1-K7 and V1 and V2.

The storability of the adhesive tapes of the invention is additionally not adversely affected even in a continuous production process on an extruder. This is shown by example K1* in direct comparison with K1.

In relation to the tip shear strength for bonds on glass surfaces, a positive effect was surprisingly found when modified epoxy resins were used (K5 to K7). After storage under moist/hot conditions at 65° C. and 90% RH for 300 h, there is a change in the fracture profile from adhesive failure (K1-K4) resulting from exchange of liquid epoxy resin Epon 828 to completely cohesive failure. The performance of the adhesives comprising silane-modified and fatty acid-modified epoxy resins is obviously comparable here. A crucial advantage of the fatty acid-modified epoxy resins compared to silane-modified epoxy resins lies not in the bonding properties, but is concealed in the application method. For instance, silane-modified adhesives show the tendency to react with the siliconized liners, as a result of which such adhesives are frequently difficult to separate from the liner after prolonged storage. This was not observed in the case of use of the fatty acid-modified epoxy resins. Without wishing to be tied to this theory, it is suspected that there is additionally a positive interaction of the accelerator used in accordance with the invention with the shears and thermal stresses that exist in the planetary roll extruder. For particularly long storability, it is particularly good when the accelerator does not dissolve in the adhesive during the production process. These heteroatom-modified imidazoles are probably "harder" and hence more resistant to the shear forces.

Example K8—Bending Test for Ascertainment of Stiffness

A specimen consisting of 250 individual wires having a wire cross section of 0.35 mm² was bundled with the aid of a 9 mm-wide adhesive tape (tesa 51618) to give a specimen cable harness, such that the specimen cable harness had a diameter of 23±5 mm and a length of 300±50 mm. This specimen cable harness was wrapped with an adhesive tape comprising an adhesive of the invention in spiral form, ensuring an overlap of 50%. Subsequently, the adhesive tape was cured by means of heat.

For production of the adhesive tape, a 19 mm- to 20 mm-wide and 220 μm-thick PET fabric carrier having a basis weight of 130 g/m² was coated with an adhesive according to example K1 at a coatweight of 150 g/m².

The cured specimen cable harness was subjected to a bending test in order to determine the influence of the stiffening material on stiffness. The bending test was undertaken on a tensile tester. For this purpose, the specimen cable harness was placed onto two jaws separated by 70 mm and subjected to a load in the middle with a crosshead for indentation by a distance of 30 mm. The force needed for the deformation of the measurement distance was recorded by a tensile tester in newtons. The testing speed was 100 mm/min both in the application of load and in the removal of load from the specimen cable harness. The test was conducted in 3 different places on the cable harness (beginning, middle and end). The bending force results from the average of the three individual measurements and was assessed in three categories as follows:

Assessment categories for 3-point bending test:
+ of good suitability for the application (500-750 N)
o of limited suitability for the application (400-500 N and 700-800 N)
− unsuitable for the application (<400 and >800 N)

By way of comparison, a commercially available adhesive tape, tesa® 51036, was subjected to the same test. The results are listed in table 1 below.

Example K9—C-Shape Test for Assessment of Stiffness at Different Temperatures

A test method was developed to ascertain the stiffness of a bent cable specimen (C cable specimen bending test). For production of a C cable specimen (see FIG. 1), a cable wire (10) having a wire cross section of 0.35 mm² is wound 100 times around a holder (1) to give a specimen cable harness. The holder (1) has two opposite semicircular guides (2, 3)

having a diameter of 120 mm, spaced apart by a distance (A) of about 210 mm. The wound cable loom is shown in FIG. 1.

The number of cable windings is 100. The result is a specimen cable harness having a diameter of 15±5 mm and a circumference of 690 mm. At the apexes of the semicircular segments and in two linear sections (limbs) in each case, the cable bundle (10) is constricted with cable ties (4, 5, 6, 7, 8, 9) with a tensile force of 210±10 N and fixed such that the cable bundle (10), after removal from the holder, has sufficient stiffness to not deform. In order to further improve the stiffness of the cable bundle (10), a rest (11) is positioned between the limbs of the cable bundle and likewise fixed with cable ties.

The cable bundle (10) thus produced is removed from the holder and wrapped with the adhesive tape to be tested (width 19 mm-20 mm) with a 50% overlap. For this purpose, wrapping is commenced at a cable tie (for example 6 or (7)) of the limb in the circular segment direction ((6)→(4) or (7)→(5)). When the wrapping reaches the cable tie (4) or (5) at the apex of the semicircular segment, the cable tie is removed and the wrapping is continued up to the next cable tie ((4)→(8) or (5)→(9)) on the opposite limb. The same procedure is also followed on the other side, in the other semicircular segment.

The specimens thus prepared are subjected to the appropriate crosslinking method (thermal energy, 110° C.). Wire cutters are used to cut open the specimens adjacent to the cable ties still present in order to obtain two "C-shaped" cable specimens (C cable specimens), each also having an unwrapped section on either side of the semicircular wrapped section. The cut is made at the distance of the diameter (120 mm) from the apex of the semicircular segment, projected to the middle of the circle.

A piece of cable is used to form loops at the ends of the limbs of the specimen, in order that it can be suspended at one end and a weight can be hung on at the other end. The remaining cable ties are now removed since they can distort the test result. The distance between the limbs is then determined.

One of the two specimens is stored at room temperature, and the other at 60° C.

A 1 kg weight is hung on the respective lower limb of the "C specimen". After one hour, the deflection of the cable bundle is noted (deflection behavior 1 h at RT or at 60° C.) and the weight is removed. After one minute, the deflection is determined again (resilience behavior 1 min at RT or 60° C.). After one hour, the deflection is determined again and noted (resilience behavior 1 h at RT or at 60° C.)

The values ascertained in the C-shape deformation were classified into three categories: of good suitability for the application, of limited suitability for the application, and unsuitable for the application. The categories were assessed as follows:

Assessment categories for C-shape bending test (room temperature):
+ of good suitability for the application (<15% deflection)
o of limited suitability for the application (>15-30%)
− unsuitable for the application (>30%)

Assessment categories for C-shape bending test (60° C.):
+ of good suitability for the application (<25% deflection)
o of limited suitability for the application (>25-40%)
− unsuitable for the application (>40%)

Assessment categories for C-shape bending test (resilience behavior at room temperature and 60° C.):
+ of good suitability for the application (<10% deflection)
o of limited suitability for the application (10-30%)
− unsuitable for the application (>30%)

By way of comparison, a commercially available adhesive tape, tesa® 51036, was subjected to the same test. The results are likewise listed in table 1 below.

TABLE 1

|  | 3-point bending test | C-shape deformation at RT | C-shape resilience behavior at RT |
|---|---|---|---|
| Example 1 |  | + | + |
| tesa® 51036 | − | − | − |

|  | C-shape deformation at 60° C. | C-shape resilience behavior at 60° C. |
|---|---|---|
| Example 1 |  | + |
| tesa® 51036 | − | − |

Legend:
+ of good suitability for the application
o of limited suitability for the application
− unsuitable for the application

The invention claimed is:

1. A method of jacketing elongate items with an adhesive tape comprising a carrier in strip form that has been provided with a pressure-sensitive adhesive on at least one side, wherein the adhesive comprises a polymeric film former matrix and a curable composition,
wherein the curable composition comprises one or more epoxy resins and at least one curing reagent for epoxy resins, wherein the curing reagent comprises at least one imidazole-acid adduct compound formed from an imidazole compound of the general formula:

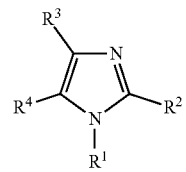

wherein $R^1$, $R^2$, $R^3$ and $R^4$ radicals are independently hydrogen or functional groups or organic radicals, with the proviso that at least one of the $R^1$, $R^2$, $R^3$ and $R^4$ radicals is a functional group or an organic $R^{Het}$ radical having at least one heteroatom,
wherein the imidazole-acid adduct compound is present in the curable composition in an amount of 0.1 to 10 parts by weight, based on 100 parts by weight of all epoxy resins in the curable composition;
said method comprising running the adhesive tape in a helical line around the elongate item or wrapping the elongate item with the adhesive tape in an axial direction of the elongate item, putting the elongate item together with the wrapping adhesive tape in a desired arrangement, holding the elongate item in this arrangement, and making the curable adhesive to cure by supplying thermal energy.

2. The method as claimed in claim 1, wherein the organic $R^{Het}$ radical having the heteroatom is an $R^{Het}_N$ radical having at least one nitrogen atom.

3. The method as claimed in claim 1, wherein the $R^{Het}$ radical having the heteroatom is an $R^{Het}_O$ radical having at least one oxygen atom.

4. The method as claimed in claim 1, wherein two or more of the $R^1$, $R^2$, $R^3$ and $R^4$ radicals are identically or independently selected functional groups or organic $R^{Het}$ radicals, each of which has at least one heteroatom.

5. The method as claimed in claim 2, wherein the $R^{Het}_N$ radical is or includes a triazine group or a cyano group.

6. The method as claimed in claim 1, wherein the $R^1$ radical is a cyanoethyl group or the $R^1$ radical is or comprises a doubly amine group-substituted triazine group.

7. The method as claimed in claim 3, wherein the $R^{Het}_O$ group is or comprises a hydroxy group.

8. The method as claimed in claim 1, wherein the $R^1$ $R^2$, $R^3$ and $R^4$ radicals that are not organic $R^{Het}$ radicals are each independently hydrogen or an aliphatic or aromatic hydrocarbyl radical which has 1 to 15 carbon atoms and does not have any heteroatoms.

9. The method as claimed in claim 1, wherein the acid of the imidazole-acid adduct compound is trimellitic acid or isocyanuric acid.

10. The method as claimed in claim 9, wherein the imidazole-acid adduct compound is 2,4-diamino-6-[2'-methylimidazolyl-(1')]-ethyl-s-triazine isocyanuric acid adduct dihydrate.

11. The method as claimed in claim 1, wherein the imidazole-acid adduct compound is used in particulate form, and is optionally in dispersed form in the curable composition.

12. The method as claimed in claim 1, wherein at least one of the epoxy resins of the curable composition is an elastomer-modified.

13. The method as claimed in claim 1, wherein the curing reagent comprises one or more compounds other than the imidazole-acid adduct compound as curing agent or accelerator for the curing reaction of the epoxy resins of the curable composition.

14. The method as claimed in claim 13, wherein the curing agents or accelerators other than the imidazole-acid adduct compound are selected from the group consisting of:
dicyandiamide
anhydrides
epoxy-amine adducts
hydrazides
reaction products of diacids and polyfunctional amines.

15. The method as claimed in claim 1, wherein polymeric film former matrices used are wholly or partly one or more thermoplastic polyurethanes or one or more non-thermoplastic elastomers.

16. A jacketed elongate item obtained according to claim 1.

17. A vehicle comprising a jacketed elongate item as claimed in claim 16.

* * * * *